(12) United States Patent
Shikii et al.

(10) Patent No.: US 8,934,159 B2
(45) Date of Patent: Jan. 13, 2015

(54) SEE-THROUGH DISPLAY AND HEAD-UP DISPLAY

(75) Inventors: Shinichi Shikii, Nara (JP); Keiji Sugiyama, Kyoto (JP); Shinichi Kadowaki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 13/379,492

(22) PCT Filed: Apr. 19, 2011

(86) PCT No.: PCT/JP2011/002289
§ 371 (c)(1),
(2), (4) Date: Dec. 20, 2011

(87) PCT Pub. No.: WO2011/132406
PCT Pub. Date: Oct. 27, 2011

(65) Prior Publication Data
US 2012/0099170 A1    Apr. 26, 2012

(30) Foreign Application Priority Data

Apr. 20, 2010  (JP) .................................. 2010-096784

(51) Int. Cl.
*G03H 1/02*  (2006.01)
*G02B 27/01*  (2006.01)
*H04N 9/31*  (2006.01)

(52) U.S. Cl.
CPC ............ *G02B 27/0103* (2013.01); *G02B 27/01* (2013.01); *H04N 9/3161* (2013.01); *G02B 2027/0112* (2013.01)
USPC ........................................................... 359/3

(58) Field of Classification Search
USPC ............... 348/148; 345/7–9, 633; 359/13–14, 359/630–633
See application file for complete search history.

(56) References Cited

U.S. PATENT DOCUMENTS 5,483,362 A * 1/1996 Tai et al. ........................... 359/1
7,131,728 B2  11/2006 Nambudiri et al.
(Continued)

FOREIGN PATENT DOCUMENTS

| CN | 101241233 | 8/2008 |
|---|---|---|
| CN | 101589327 | 11/2009 |

(Continued)

OTHER PUBLICATIONS

Nakamura et al. "Present Status of InGaN based Laser Diodes," 1999, Nichia Chemical Industries pp. 15-23.*
(Continued)

*Primary Examiner* — William Choi
*Assistant Examiner* — Sharrief Broome
(74) *Attorney, Agent, or Firm* — Wenderoth, Lind & Ponack, L.L.P.

(57) ABSTRACT

A see-through display including a light source for emitting light, a projection optical system for projecting the light emitted by the light source, and a volume hologram for deflecting the light projected by the projection optical system. The volume hologram has a linear expansion coefficient of $\alpha$ (/° C.) and interference fringes recorded with recording light having a wavelength of $\Lambda$ (nm). The wavelength of the light emitted by the light source has a temperature dependency of K (nm/° C.), and the wavelength $\Lambda$ (nm) and the temperature dependency K (nm/° C.) satisfy the relationship of $0 \leq K/\Lambda \leq 2\alpha$.

12 Claims, 23 Drawing Sheets

(56) References Cited

U.S. PATENT DOCUMENTS

| | | | |
|---|---|---|---|
| 7,370,973 B2 | 5/2008 | Sakaguchi et al. | |
| 7,502,153 B2 * | 3/2009 | Shimizu | 359/13 |
| 7,784,945 B2 | 8/2010 | Sugiyama | |
| 2001/0048554 A1 * | 12/2001 | Yona et al. | 359/434 |
| 2005/0140929 A1 | 6/2005 | Nambudiri et al. | |
| 2006/0001977 A1 * | 1/2006 | Shimizu | 359/630 |
| 2006/0023164 A1 | 2/2006 | Sakaguchi et al. | |
| 2006/0215528 A1 * | 9/2006 | Hirao et al. | 369/103 |
| 2007/0279755 A1 * | 12/2007 | Hitschmann et al. | 359/630 |
| 2008/0181276 A1 * | 7/2008 | Kawanaka et al. | 372/45.013 |
| 2008/0192045 A1 | 8/2008 | Brandt et al. | |
| 2009/0052300 A1 * | 2/2009 | Tokuchi et al. | 369/103 |
| 2009/0115968 A1 | 5/2009 | Sugiyama | |
| 2009/0231687 A1 * | 9/2009 | Yamamoto | 359/359 |
| 2010/0060551 A1 | 3/2010 | Sugiyama et al. | |

FOREIGN PATENT DOCUMENTS

| | | | | |
|---|---|---|---|---|
| JP | 9-68917 | | 3/1997 | |
| JP | 2000-132073 | | 5/2000 | |
| JP | 2000132073 A | * | 5/2000 | G03H 1/22 |
| JP | 2003-114648 | | 4/2003 | |
| JP | 2006-47422 | | 2/2006 | |
| JP | 2007-526498 | | 9/2007 | |
| JP | 2009-134276 | | 6/2009 | |
| JP | 2010-79197 | | 4/2010 | |
| JP | 2011-90076 | | 5/2011 | |
| WO | 2011/074209 | | 6/2011 | |

OTHER PUBLICATIONS

Dhar et al. "Temperature Induced Changes in Photopolymer Volume Holograms," 1998, Applied Physics Letters, vol. 73, pp. 1337-1339.*
Bercha et al. "Pressure and temperature tuning of InGaP/AlGaInP Laser Diodes from red to Yellow," Jan. 22, 2009, Phsica Status Solodi, vol. 246 pp. 508-511.*
Boney et al. "II-VI blue/green laser diodes on ZnSe Substrates" 1995, Journal of Vacuum Society, vol. 13, pp. 2259-2262.*
English Translation of Chinese Search Report issued Jan. 20, 2014 in corresponding Chinese Patent Application No. 201180002476.3.
International Search Report issued Aug. 9, 2011 in International (PCT) Application No. PCT/JP2011/002289.

* cited by examiner

SEE-THROUGH DISPLAY AND HEAD-UP DISPLAY

TECHNICAL FIELD

The present invention is principally related to a see-through display which is used as an image display apparatus such as head-up displays (HUDs) and head-mount displays (HMDs).

BACKGROUND OF THE INVENTION

An image display apparatus called head-up display (HUD) principally displays information which is required for maneuver or operation in automobiles or aircraft cockpits. An automobile driver or aircraft pilot may perceive the information displayed by the HUD as if the displayed information is present in front of the windshield.

An image display apparatus called head-mount display (HMD) is worn in the same manner as ordinary vision correction glasses. A user wearing an HMD may perceive an image displayed by the HMD as if displayed information is present in a space in front of the display lens.

The HUD and the HMD both allow a user to view images through a substantially transparent part such as windshield or lens part, and therefore these image display apparatuses are called "see-through display". Recently these image display apparatuses have been developed a lot.

For example, a driver of an automobile on which the HUD is mounted may look forward to view information required for driving with little shift of the visual line. Therefore, the HUD may provide high safety and convenience.

The HMD may consume little power to provide a user with large images. In addition, the user may view images at any location and obtain necessary information at any place any time.

The see-through display has to mix a displayed image with external light (natural light) received from environment such as landscape. For example, the HUD mounted on an automobile mixes a displayed image with external light received from the environment near the windshield by means of a combiner. Preferably, there is little light loss both for the received external light and the displayed image during the mixture of the displayed image with the received external light.

A conventional see-through display uses a volume hologram as the combiner (cf., Patent Document 1). If the hologram is used as the combiner, an image displayed by the HUD is enlarged due to a lens effect of the hologram, so that the user may view the enlarged image.

The volume hologram does not generate high-order diffracted light. Therefore, there is a low percentage loss of the externally received light due to the diffraction by the volume hologram. The volume hologram causes highly efficient diffraction for a predetermined wavelength. For example, if a laser source is used as a light source, the HUD may achieve highly efficient light utilization due to a narrow wavelength band of the laser beam.

Interference fringes are recorded in the volume hologram used for the conventional see-through display. If a laser beam having a slightly different wavelength from that of the recording light used to record the interference fringes is incident on the volume hologram, the diffraction angle is slightly shifted from a desired direction. Therefore, if the wavelength of light emitted from a light source of the see-through display having such a volume hologram differs from the wavelength of the recording light used to record the interference fringes of the volume hologram, a display position of an image may be shifted from the desired position.

A see-through display typically has several light sources. These light sources emit different light in hue from each other. The positions of images formed with the light from the light sources of the see-through display may differ from each other, hue by hue, because of factors such as the light wavelength emitted by the light sources as well as thermal changes in wavelength. If an image is formed by mixing colors, a color shift in the image becomes more visually noticeable by factors such as individual variations of the wavelengths of the light sources and thermal changes in wavelength. For example, if there is a thermal change in wavelength from the light source, diffraction efficiency may go down to cause irregular luminance distribution and color distribution in the image. In addition, the luminance of the entire image may be reduced.

Patent Document 1: JP 2007-526498 A

DISCLOSURE OF THE INVENTION

An object of the present invention is to provide a see-through display configured to display quality images.

An aspect of the present invention is related to a see-through display including: a light source configured to emit light; a projection optical system configured to project the light which is emitted by the light source; and a volume hologram configured to deflect the light which is projected by the projection optical system, wherein: the volume hologram has a linear expansion coefficient of $\alpha$ (/° C.) and interference fringes recorded with recording light having a wavelength of $\Lambda$ (nm); a wavelength of the light emitted by the light source has a temperature dependency of K (nm/° C.); and the wavelength $\Lambda$ (nm) and the temperature dependency K (nm/° C.) satisfy a relationship of $0 \leq K/\Lambda \leq 2\alpha$.

Another aspect of the present invention is related to a see-through display including: a light source configured to emit light; a projection optical system configured to project the light which is emitted by the light source; a volume hologram configured to deflect the light which is projected by the projection optical system; and an adjuster configured to adjust a temperature of the light source, wherein: a wavelength of the light emitted by the light source has a temperature dependency; the volume hologram has a linear expansion coefficient of $\alpha$, and interference fringes recorded with recording light having a center wavelength of $\Lambda$; and the adjuster adjusts the temperature of the light source based on the linear expansion coefficient $\alpha$ and the center wavelength $\Lambda$ of the recording light.

Yet another aspect of the present invention is related to a see-through display including: a light source including n (n is an integer greater than 1) light source elements configured to emit light; a projection optical system configured to project the light which is emitted by the light source; and a volume hologram configured to deflect the light which is projected by the projection optical system, wherein: the volume hologram has interference fringes formed by means of recording light having wavelengths of $\Lambda 1, \Lambda 2, \ldots, \Lambda n$ in order to diffract the light emitted by the n light source elements, respectively; wavelengths of the light, which is emitted by the n light source elements and diffracted by the interference fringes formed with the recording light having wavelengths of $\Lambda 1, \Lambda 2, \ldots, \Lambda n$, have temperature dependencies of K1 (nm/° C.), K2 (nm/° C.), Kn (nm/° C.), respectively; and a difference value between a maximum value and a minimum value among $K1/\Lambda 1, K2/\Lambda 2, \ldots$, and $Kn/\Lambda n$ is 0.0001 or less.

Yet another aspect of the present invention is related to a see-through display including: a light source configured to emit light; a projection optical system configured to project the light which is emitted by the light source; and a volume hologram configured to deflect the light which is projected by the projection optical system, wherein: the light source includes a first light source element which emits first light having a first wavelength, and a second light source element which emits second light having a different wavelength from the first wavelength; and a first image formed with the first light is displayed at a distant position from that of a second image formed with the second light.

Yet another aspect of the present invention is related to a see-through display including: a light source configured to emit light; a projection optical system configured to project the light which is emitted by the light source; and a volume hologram configured to deflect the light which is projected by the projection optical system, wherein the projection optical system includes an MEMS mirror which reflects the light from the light source, and a modulator which modulates a polarization direction of the light emitted by the light source before the MEMS mirror reflects the light from the light source.

Yet another aspect of the present invention is related to a see-through display including: a light source configured to emit light; a projection optical system configured to project the light, which is emitted by the light source, to form a frame image; and a volume hologram configured to deflect the light which is projected by the projection optical system, wherein: the projection optical system includes an MEMS mirror; the frame image is formed by means of time-divided sub-frames; and a light amount emitted by the light source is zero or a maximum value in at least one of the sub-frames.

Yet another aspect of the present invention is related to a head-up display mounted on a vehicle having a windshield in which an intermediate film intervenes to selectively adjust a wavelength component of light entering into a cabin of the vehicle. The head-up display includes the aforementioned see-through display, and the volume hologram is situated between the cabin and the intermediate film.

DETAILED DESCRIPTION OF THE INVENTION

Figure 1:
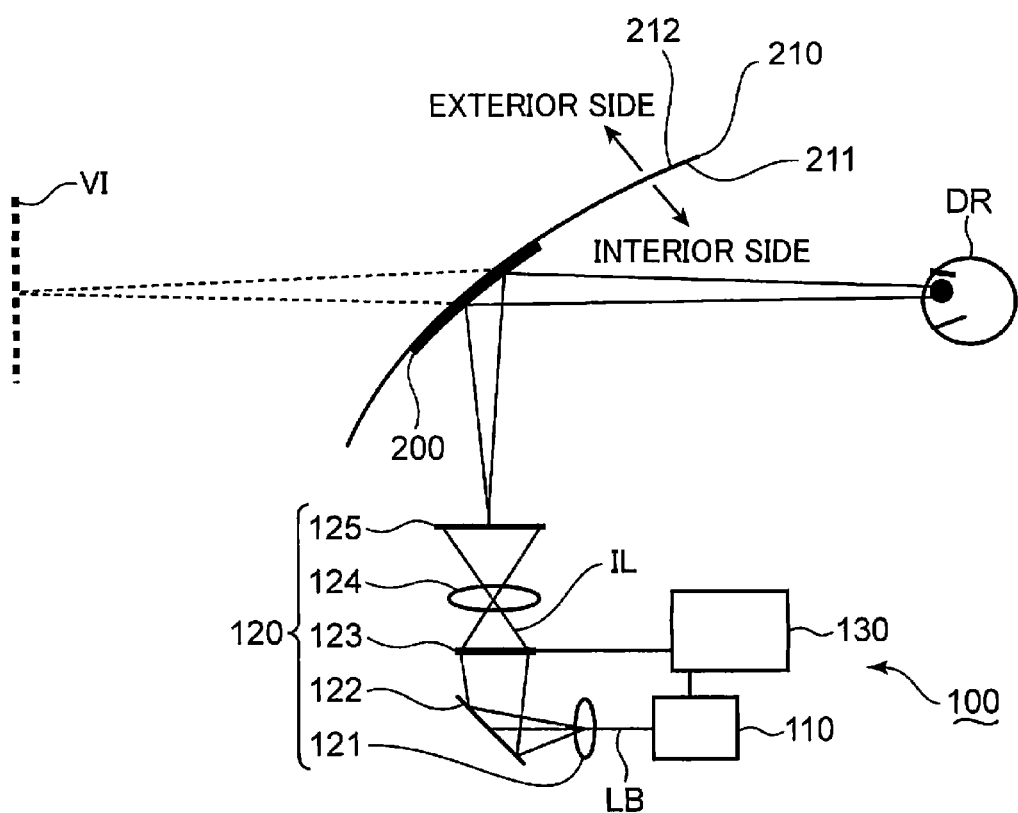
FIG. 1 is a schematic view of a head-up display exemplified as a see-through display according to the first embodiment.

See-through displays according to various embodiments are described with reference to the accompanying drawings. In the drawings, components having the same or similar functions or performing similar operations are assigned with similar reference numerals. In order to avoid redundancy in descriptions, redundant descriptions are omitted as appropriate. In order to facilitate understanding of principles of various embodiments, components are schematically illustrated in the drawings. Accordingly, shapes of the components are merely schematically illustrated in the drawings, and it does not limit in any way the principles of the embodiments described below.

First Embodiment

FIG. 1 is a schematic view of a head-up display (hereafter abbreviated as "HUD") exemplified as a see-through display according to the first embodiment. The head-up display is described with reference to FIG. 1.

(Configuration of Head-Up Display)

The HUD 100 schematically shown in FIG. 1 is mounted, for example, on an automobile. An automobile windshield 210 is shown in FIG. 1. The windshield 210 has an inner surface 211 defining an inner boundary of the automobile cabin and an outer surface 212 opposite to the inner surface 211.

The HUD 100 has a laser source 110 which emits a laser beam LB, a projection optical system 120 which projects the laser beam LB emitted by the laser source 110, and a volume hologram 200 which is attached on the inner surface 211 of the windshield 210. The projection optical system 120 has a lens 121, a return mirror 122, a liquid crystal panel 123, a projection lens 124, and a screen 125. In this embodiment, the laser source 110 is exemplified as the light source configured to emit light.

The HUD 100 further comprises a controller 130. The controller 130 is electrically connected to the laser source 110 and the liquid crystal panel 123. The laser source 110 and the liquid crystal panel 123 are operated under control of the controller 130.

(Operation of Head-Up Display)

Operation of the HUD 100 according to the first embodiment is described with reference to FIG. 1.

The controller 130 outputs a control signal to make the laser source 110 emit the laser beam LB. The laser source 110 emits the laser beam LB towards the lens 121 in response to the control signal from the controller 130. The laser beam LB passing through the lens 121 is reflected by the return mirror 122 toward the liquid crystal panel 123, so that the liquid crystal panel 123 is two-dimensionally illuminated with the laser beam LB.

The lens 121 enlarges the laser beam LB to efficiently illuminate the liquid crystal panel 123. The return mirror 122 is arranged to return the laser beam LB, so that the HUD 100 becomes compact. It should be understood that the lens for enlarging the laser beam and the return mirror for returning the laser beam may be omitted depending on specifications of the HUD or characteristics of the laser source.

The controller 130 outputs a control signal to create a display pattern of an image on the liquid crystal panel 123. The liquid crystal panel 123 creates the display pattern of the image in response to the control signal from the controller 130. Since the liquid crystal panel 123 is illuminated with the laser beam LB, as described above, intensity of the laser beam LB is two-dimensionally modulated, and then the laser beam LB is emitted from the liquid crystal panel 123 as image light IL.

The projection lens 124 forms an image of the image light IL emitted from the liquid crystal panel 123 on the screen 125. As a result, an image is displayed on the screen 125.

The volume hologram 200 diffracts the image light IL emitted from the screen 125 and deflects it towards the driver DR. As a result, the driver DR may view a virtual image VI enlarged by the volume hologram 200 through the windshield 210.

An optical system having another optical configuration may be used as the projection optical system 120, as long as the functions of the projection optical system described with reference to FIG. 1 are achieved. Accordingly, the optical configuration of the projection optical system 120 shown in FIG. 1 does not limit in any way the principles of this embodiment.

(Diffraction Principle of Volume Hologram)

Figure 2A:
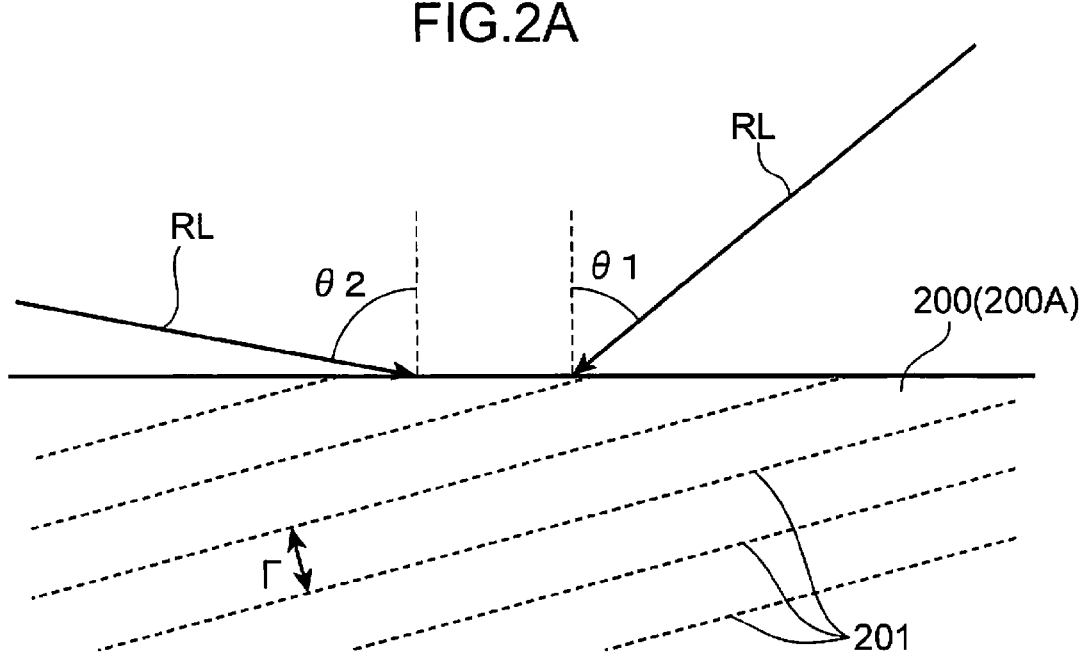
FIG. 2A is a schematic view of a volume hologram in which interference fringes are formed.
Figure 2B:
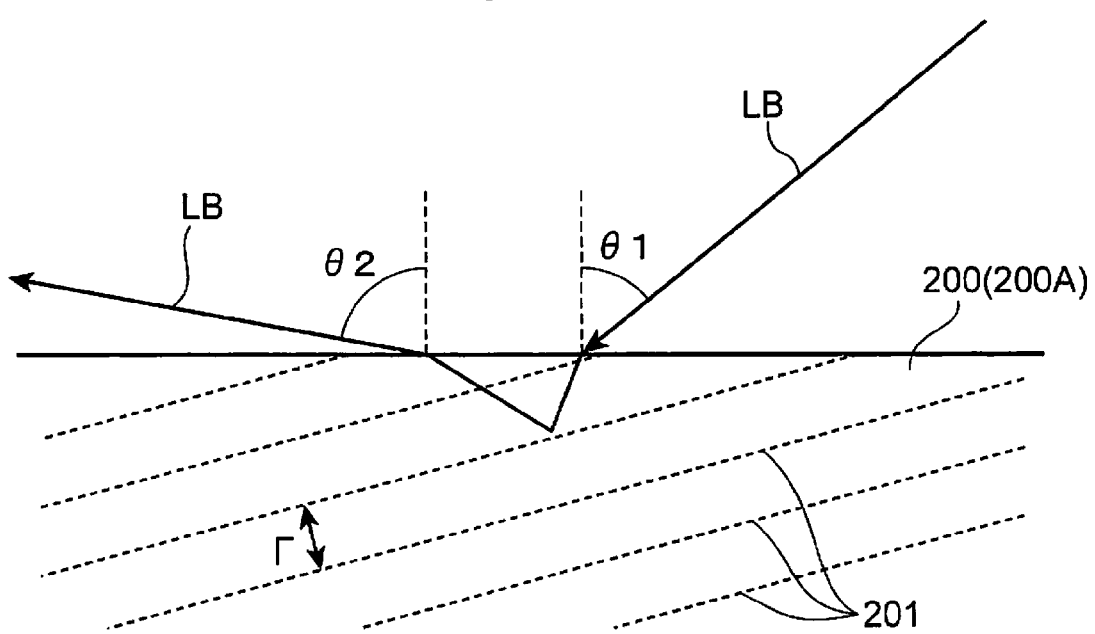
FIG. 2B is a schematic view of the volume hologram on which a laser beam is incident after the formation of the interference fringes.

FIG. 2A is a schematic view of a volume hologram 200 in which interference fringes are formed. FIG. 2B is a schematic view of the volume hologram 200 on which the laser beam LB is incident after the formation of the interference fringes. Diffraction principles of the volume hologram are described with reference to FIGS. 1 to 2B.

The interference fringes 201 are formed in the volume hologram 200. In order to form the interference fringes 201, a laser beam having a wavelength substantially equal to that of the laser beam LB described with reference to FIG. 1 (hereafter, referred to as the recording light RL) is separated into two beams. The recording light RL separated into two beams is incident on the volume hologram 200 at angles of θ1 and θ2 as shown in FIG. 2A. As a result, the interference fringes 201 are formed in the volume hologram 200 at interference fringe intervals Γ.

If the laser beam LB is incident on the volume hologram 200 at the angle θ1 after the formation of the interference fringes 201, the volume hologram 200 diffracts the laser beam LB at a given diffraction efficiency. As a result, the laser beam LB is emitted from the volume hologram 200 in a direction of the angle θ2. This condition is generally called the Bragg condition.

(Effect of Temperature Fluctuations)

It is described how changes in temperature around the HUD 100 affect the diffraction of the volume hologram 200.

The volume hologram 200 and the laser source 110 are typically more sensitive to temperature variation around the HUD 100 than the other various elements of the HUD described with reference to FIG. 1. It is described how the temperature variation around the HUD affects the volume hologram 200 and the laser source 110.

The volume hologram 200 expands or contracts in response to the temperature variation around the HUD 100 to vary the interference fringe intervals Γ. The variation in interference fringe interval Γ changes diffraction angle or diffraction efficiency of the volume hologram 200. For example, if the wavelength of the laser beam LB is consistent and the volume hologram 200 isotropically expands because of a temperature rise around the HUD 100, and if the angle θ2 is greater than the angle θ1 as shown in FIG. 2B, the laser beam LB incident at the angle θ1 is emitted from the volume hologram 200 at an angle which is smaller than the angle θ2 before the expansion of the volume hologram 200. As a result of deviation from the Bragg condition, the diffraction efficiency also goes down in comparison with the efficiency before the temperature rise around the HUD 100. On the contrary, if the temperature around the HUD 100 drops, the laser beam LB incident on the volume hologram 200 at the angle θ1 is emitted from the volume hologram 200 at an angle which is greater than the angle θ2. Under a condition of the angle θ1 which is smaller than the angle θ2, the laser beam LB is emitted from the volume hologram 200 at an angle greater than the angle θ2 before the expansion of the volume hologram 200 if the temperature around the HUD 100 rises. On the contrary, if the temperature around the HUD 100 drops, the laser beam LB is emitted from the volume hologram 200 at an angle smaller than the angle θ2 before the contraction of the volume hologram 200.

As described above, if the volume hologram 200 expands or contracts because of the temperature changes, the deviation direction from the Bragg condition differs depending on a magnitude relationship between the angles θ1 and θ2. However, since the deviation from the Bragg condition occurs in any case, the diffraction efficiency goes down in comparison with the efficiency before the temperature change around the HUD 100.

A semiconductor laser source is exemplified as the laser source 110 according to this embodiment. If there are changes in temperature around the semiconductor laser source, the laser beam LB emitted by the semiconductor laser source also changes its wavelength. In general, as the temperature around a semiconductor laser source becomes higher, a forbidden band width of a semiconductor band structure becomes narrower. Therefore, the oscillation wavelength of the laser beam LB emitted by the semiconductor laser source is shifted to the lower energy side (the longer wavelength side). The wavelength variation of the laser beam LB changes diffraction angle or diffraction efficiency of the volume hologram.

If the wavelength of the laser beam LB is shifted to a longer wavelength side by a temperature rise around the semiconductor laser source used as the laser source 110 and the angle θ2 becomes greater than the angle θ1 as shown in FIG. 2B under a condition of the fixed interference fringe interval Γ in the volume hologram 200, the laser beam LB incident on the volume hologram 200 at the angle θ1 is emitted from the volume hologram 200 at an angle greater than the angle θ2 before the wavelength variation of the laser beam LB. As a result of the deviation from the Bragg condition, the diffraction efficiency becomes lower than that before the temperature rise around the laser source 110. On the contrary, if the temperature around the laser source 110 drops, the laser beam LB is emitted from the volume hologram 200 at a smaller angle than the angle θ2. If the angle θ2 is smaller than the angle θ1 and the temperature around the laser source 110 rises, the laser beam LB is emitted from the volume hologram 200 at a smaller angle than the angle θ2 before the wavelength variation of the laser beam LB. On the contrary, if the temperature around the laser source 110 drops, the laser beam LB is emitted from the volume hologram 200 at an angle greater than the angle θ2.

As described above, if the wavelength of the laser beam LB varies because of the temperature changes, the deviation direction from the Bragg condition depends on a magnitude relationship between the angles θ1 and θ2. However, since there is the deviation from the Bragg condition in any case, the diffraction efficiency becomes lower in comparison with the efficiency before the temperature variation around the laser source 110.

On the basis of the aforementioned considerations, the deviation direction from the Bragg condition caused by expansion or contraction of the volume hologram 200 because of the temperature variation around the HUD 100 is preferably set so as to be opposite to the deviation direction from the Bragg condition caused by the wavelength variation of the laser source 110 because of the temperature variation around the laser source 110. The shift from the Bragg condition is cancelled if the expansion or contraction of the volume hologram 200 and the shift of wavelength of the laser beam LB simultaneously occur as a result of the temperature variation around the HUD 100 and/or the laser source 110.

If a light source configured to shift the wavelength to a longer wavelength side under a temperature rise is used as the laser source 110 (e.g. a semiconductor laser source), it becomes less likely that the variation in diffraction angle or the decreased diffraction efficiency causes deterioration in image quality such as positional shift of the image display or reduction in luminance, in comparison with if the temperature variation expands or contracts the volume hologram alone or varies the laser beam wavelength alone, which is emitted by laser source.

In general, it depends on a type of semiconductor used for the semiconductor laser source how much the laser beam wavelength emitted by the semiconductor laser source varies with the temperature. For example, a semiconductor laser source having an active layer consisting of aluminum (Al), gallium (Ga), indium (In), and phosphorus (P) is exemplified as a commonly-used red laser source. A temperature dependency K of a laser beam wavelength emitted by the semiconductor laser source is about 0.2 nm/° C. A linear expansion coefficient α of a volume hologram commonly used in a see-through display is about $2.0 \times 10^{-4}$/° C.

Figure 3:
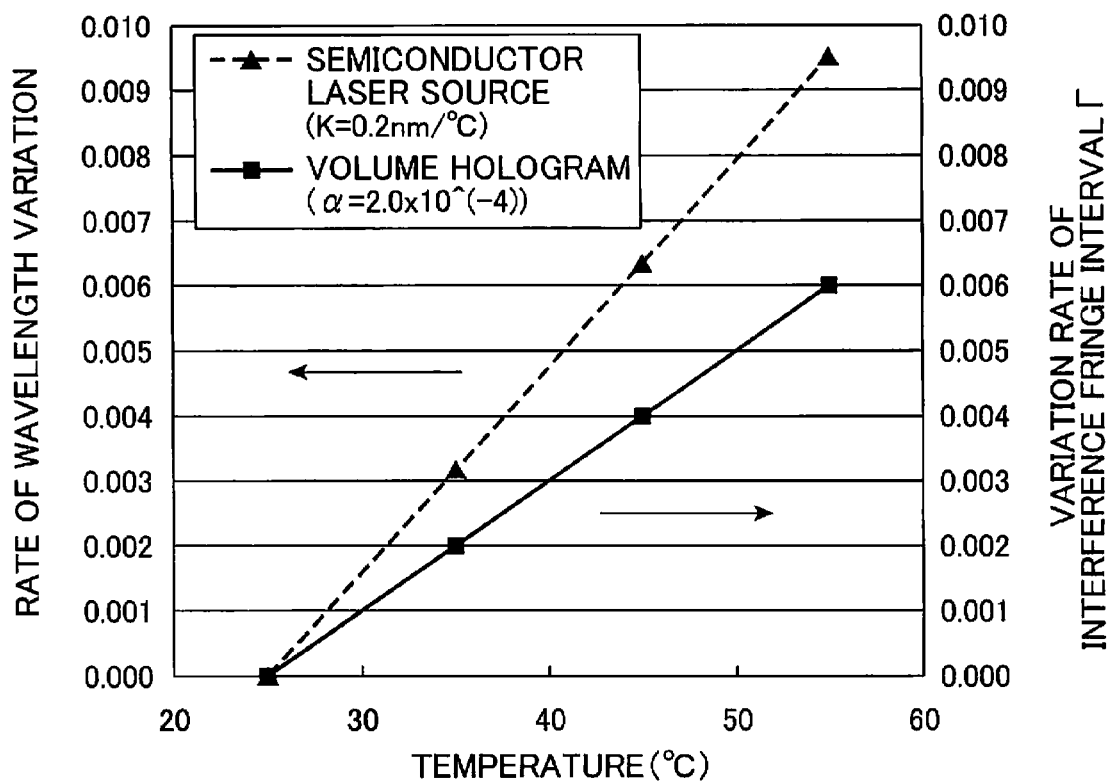
FIG. 3 is a graph schematically showing temperature expansion characteristics of the volume hologram and temperature dependency on laser beam wavelength.

FIG. 3 is a graph schematically showing temperature expansion characteristics of the volume hologram and temperature dependency of laser beam wavelength. The temperature expansion characteristics of the volume hologram and temperature dependency of laser beam wavelength are described with reference to FIG. 3.

The temperature expansion characteristics shown in FIG. 3 are obtained from a volume hologram having a linear expansion coefficient α of $2.0 \times 10^{-4}$/° C. The temperature dependency of laser beam wavelength shown in FIG. 3 is obtained from a red laser beam emitted by a red semiconductor laser source having a wavelength temperature dependency K of 0.2 nm/° C.

The horizontal axis of the graph in FIG. 3 represents a temperature. The left vertical axis of the graph in FIG. 3 represents a rate of wavelength variation caused by temperature changes. The right vertical axis of the graph in FIG. 3 represents a rate of variation in interference fringe interval Γ of a volume hologram which expands because of the temperature changes.

In the graph of FIG. 3, the wavelength of the red laser beam is 637 nm at 25° C. If the temperature becomes 45° C., for example, the amount of temperature variation is 20° C. Therefore, the rate of the wavelength variation becomes 0.0063 (=20 (° C.)×0.2 (nm/° C.)/637 (nm)) if the temperature rises from 25° C. to 45° C. The rate of variation in a one-dimensional direction of the interference fringe interval Γ of the volume hologram is 0.004 (=$2.0 \times 10^{-4}$/° C.×20° C.) under the temperature which rises from 25° C. to 45° C. Accordingly, the difference between the rate of wavelength variation and the rate of variation of interference fringe interval Γ is 0.0023.

The aforementioned considerations reveal that the use of a semiconductor laser source having the aforementioned wavelength dependency together with the volume hologram suitably reduces the shift from the Bragg condition caused by the temperature changes. Therefore, if a see-through display such as an HUD utilizing a volume hologram has a light source which shifts the wavelength to the longer wavelength side under a temperature rise (e.g. a semiconductor laser source), it becomes less likely that the variation in diffraction angle or the decreased diffraction efficiency causes the deterioration in image quality such as positional shift of the image display or reduction in luminance even if the temperature changes.

A semiconductor laser source is usually the most inexpensive among laser sources. Therefore, usage of the semiconductor laser source as a light source for the HUD results in an economical HUD. It is obvious that the same advantageous effects described above may be obtained with the use of the semiconductor laser source with a semiconductor having other compositions than what are aforementioned. Thus, the principles of this embodiment are not limited to a red semiconductor laser source having a semiconductor with the aforementioned compositions. Another light source than the semiconductor laser source may be used to obtain the aforementioned advantageous effects if the wavelength of light from the light source has the same temperature characteristics as what are aforementioned.

As a result of studies based on the aforementioned principles, the inventors have found that the variation in diffraction angle or the decreased diffraction efficiency is less likely to cause deterioration in image quality such as positional shift of the image display or the reduction of luminance under the following conditions. The conditions for suppressing the deterioration in image quality are described with reference to FIGS. 1 to 3.

If the volume hologram 200 has a linear expansion coefficient of α (/° C.) and the interference fringes 201 recorded with the recording light RL having a wavelength of Λ (nm) (see FIG. 2A), and the wavelength of a laser beam LB emitted by the laser source 110 has a temperature dependency of K (nm/° C.), deviation from the Bragg condition because of temperature changes may be reduced in a see-through display (HUD 100) utilizing the volume hologram 200 if the wavelength Λ (nm) and the temperature dependency K (nm/° C.) satisfy the relationship represented by the following equation (1).

[Equation 1]

$$0 \leq K/\Lambda \leq 2\alpha \qquad (1)$$

If the relationship represented by the aforementioned equation (1) is satisfied, it becomes less likely that the variation in diffraction angle or the decreased diffraction efficiency causes the deterioration in image quality such as positional shift of the image display or reduction in luminance.

Figure 4:
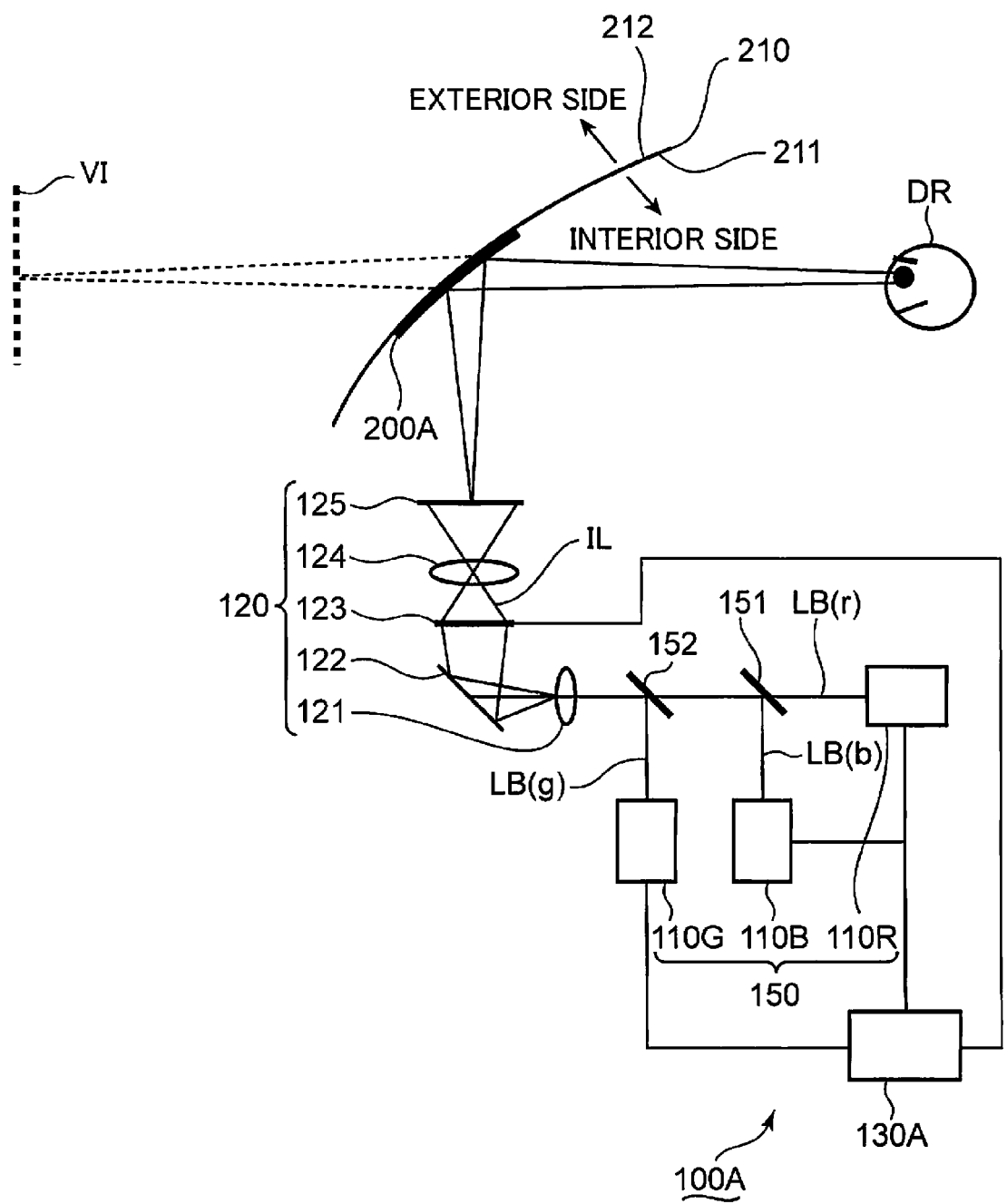
FIG. 4 is a schematic view of a head-up display exemplified as another see-through display according to the first embodiment.

FIG. 4 is a schematic view of an HUD exemplified as another see-through display according to the present embodiment. The HUD is described with reference to FIGS. 1 and 4.

The HUD 100A shown in FIG. 4 has a projection optical system 120 like the HUD 100 described with reference to FIG. 1. However, unlike the HUD 100 described with reference to FIG. 1, the HUD 100A comprises a light source 150 having a red semiconductor laser source 110R, a green semiconductor laser source 110G, and a blue semiconductor laser source 110B. The red, green and blue semiconductor laser sources 110R, 110E 110B emit red, green and blue laser beams LB(r), LB(g), LB(b), respectively. In this embodiment, the red, green and blue semiconductor laser sources 110R, 110G, 110B are exemplified as the light source elements.

The HUD 100A further includes a controller 130A. The controller 130A is electrically connected to the red, green and blue semiconductor laser sources 110R, 110G, 110B, and the liquid crystal panel 123. The red, green and blue semiconductor laser sources 110R, 110G, 110B, and the liquid crystal panel 123 are operated under the control of the controller 130A.

The HUD 100A further includes dichroic mirrors 151, 152. The red semiconductor laser source 110R emits the red laser beam LB(r) toward the dichroic mirror 151. The blue semiconductor laser source 110B also emits the blue laser beam LB(b) toward the dichroic mirror 151. The dichroic mirror 151 multiplexes the red and blue laser beams LB(r), LB(b). The laser beams multiplexed by the dichroic mirror 151 are propagated toward the dichroic mirror 152. The green semiconductor laser source 110G emits the green laser beam LB(g) toward the dichroic mirror 152. The dichroic mirror 152 multiplexes the green laser beam LB(g) with the laser beams multiplexed by the dichroic mirror 151. The three-color laser beams multiplexed by the dichroic mirror 152 enter the projection optical system 120.

As described with reference to FIG. 1, the projection optical system 120 includes the lens 121, the return mirror 122, the liquid crystal panel 123, the projection lens 124 and the screen 125. The red, green and blue laser beams LB(r), LB(g), LB(b) illuminate the liquid crystal panel 123 to emit image light IL including the red, green and blue laser beams LB(r), LB(g), LB(b) from the liquid crystal panel 123. After that, an image formed by the red, green and blue laser beams LB(r), LB(g), LB(b) is displayed on the screen 125.

The HUD 100A further includes a volume hologram 200A attached to the inner surface 211 of the windshield 210. The red, green and blue laser beams LB(r), LB(g), LB(b) emitted from the screen 125 are diffracted by the volume hologram 200A toward a driver DR. As a result, the driver DR may view a virtual image VI enlarged by the volume hologram 200A through the windshield 210.

The volume hologram 200A may be a single hologram element in which multiple interference fringes corresponding to red, green and blue hues are recorded. Alternatively, the volume hologram 200A may be formed by stacking hologram elements in which interference fringes corresponding to red, green and blue hues are formed, respectively.

As described with reference to FIG. 1, if the temperature around the red, green and/or blue semiconductor laser sources 110R, 110G, 110B goes up, the wavelengths of the red, green and blue laser beams LB(r), LB(g), LB(b) are shifted to the longer wavelength side.

Figure 5:
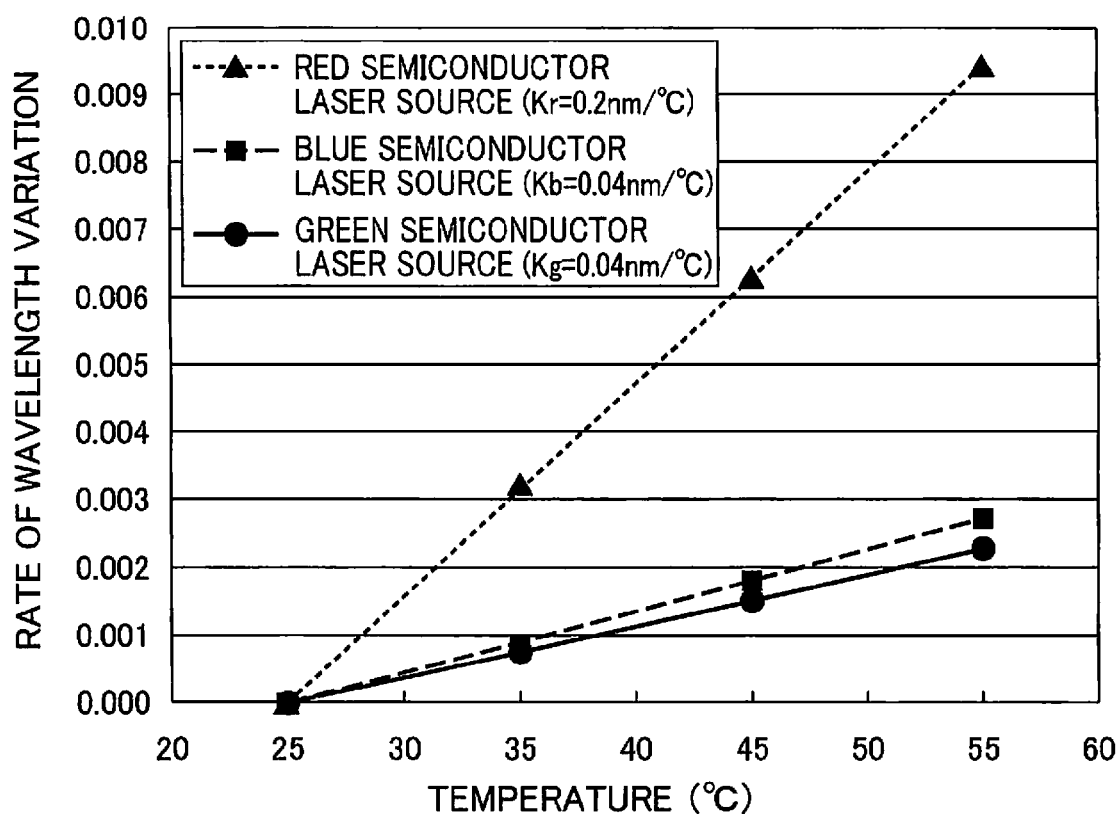
FIG. 5 is a graph schematically showing temperature dependency on wavelengths of red, green and blue laser beams.

FIG. 5 is a graph schematically showing temperature dependencies of the wavelengths of the red, green and blue laser beams LB(r), LB(g), LB(b). The temperature dependencies of the wavelengths of the red, green and blue laser beams LB(r), LB(g), LB(b) are described with reference to FIGS. 2B, 4 and 5.

In the graph of FIG. 5, the horizontal axis represents a temperature. The vertical axis in the graph of FIG. 5 represents a variation rate of wavelength which varies because of temperature changes around the red, green and/or blue semiconductor laser sources 110R, 110G, 110B.

The graph of FIG. 5 shows how much the wavelengths of the red, green and blue laser beams LB(r), LB(g), LB(b) at 25° C. varies in response to the changes in temperature. In FIG. 5, the temperature dependency of wavelength of the red laser beam LB(r) from the red semiconductor laser source 110R is represented by the symbol "Kr". The temperature dependency of wavelength of the green laser beam LB(g) from the green semiconductor laser source 110G is represented by the symbol "Kg". The temperature dependency of wavelength of the blue laser beam LB(b) from the blue semiconductor laser source 110B is represented by the symbol "Kb".

For example, the red semiconductor laser source 110R may be a semiconductor laser source having an active layer consisting of aluminum (Al), gallium (Ga), indium (In), and phosphorus (P). In this case, the temperature dependency Kr of wavelength of the red laser beam LB(r) is about 0.2 nm/° C.

Each of the green and blue semiconductor laser sources 110G, 110B may be a well-known semiconductor laser source having an active layer consisting of indium (In), gallium (Ga), and nitrogen (N). In this case, the temperature dependency Kg of wavelength of the green laser beam LB(g) is about 0.04 mm/° C. The temperature dependency Kb of wavelength of the blue laser beam LB(b) is also about 0.04 nm/° C.

In FIG. 5, the wavelength of the red laser beam LB(r) from the red semiconductor laser source 110R at a temperature of 25° C. is 637 nm. The wavelength of the green laser beam LB(g) from the green semiconductor laser source 110G is 532 nm. The wavelength of the blue laser beam LB(b) from the blue semiconductor laser source 110B is 445 nm.

If the used semiconductor laser source emits a laser beam having substantially the same wavelength as the recording light used to record the interference fringes of the volume hologram 200A at 25° C., the wavelength of the laser beam emitted by the semiconductor laser source is shifted to the longer wavelength side under a temperature rise around the semiconductor laser source. As a result, the Bragg condition is not satisfied so that the diffraction angle varies.

If the wavelength of the laser beam LB becomes longer under the Bragg condition where the angle $\theta 2$ at which the laser beam LB is emitted from the volume hologram 200A is greater than the angle $\theta 1$ at which the laser beam LB is incident on the volume hologram 200A as shown in FIG. 2B, the emission angle at which the laser beam LB is emitted from the volume hologram 200A becomes greater than the angle $\theta 2$ as described above. For example, if a laser light source having characteristics in which the wavelength is fixed regardless of temperature changes (for example, a wavelength conversion laser source which converts wavelength of a fundamental wave emitted by a solid laser element to generate a green laser beam) may be used instead of the green semiconductor laser source 110G of the light source 150 of the HUD 100A, there are few changes in wavelength of the green laser beam, for example, even if the temperature around the laser source becomes 45° C. On the other hand, the wavelength of the red laser beam LB(r) becomes longer than the wavelength under the condition of 25° C. by about 0.0062 times of the wavelength. Therefore, the angle $\theta 2$ at which the red laser beam LB(r) is emitted from the volume hologram 200A differs from the angle $\theta 2$ at which the green laser beam is emitted by the green laser source that is less susceptible to the temperature changes. Thus, the driver DR may view a virtual image VI with a color shift by an amount corresponding to the wavelength variation rate of 0.0062 times between the red image formed by the red laser beam LB(r) and the green image formed by the green laser beam emitted by the green laser source which is less susceptible to the temperature changes.

The HUD 100A according to this embodiment has light sources configured to emit light with shifting the wavelengths to the longer wavelength side under a temperature rise as the light source 150 (the red, green and blue semiconductor laser sources 110R, 110G, 110B). For example, the wavelength of the green laser beam LB(g) emitted by the green semiconductor laser source 110G at 45° C. is longer by about 0.0016 times of the wavelength than the wavelength at 25° C.

If the green semiconductor laser source 110G is used as a light source to emit light with a green hue, a difference between angles at which the red and green laser beams LB(r), LB(g) are emitted from the volume hologram 200A, respectively, is decreased by about ¼ ((0.0062−0.0016)/0.0016=0.74) in comparison with if a laser source is used to emit a green laser beam with a fixed wavelength independently from the temperature. Therefore, the amount of image shift is also reduced by about ¼.

The principles of the reduction in image shift amount are not limited to the light hue emitted by the light source. The above principles of the reduction in image shift amount may also be applied to a light source emitting a laser beam with a given hue.

Consequently, the principles of this embodiment may be applied to a see-through display (head-up display) having n (n is an integer greater than 1) light source elements which emit light with different hues (different wavelengths). If all of the n light source elements shift the wavelengths to the longer wavelength side under a temperature rise, the relative positional shift between the images (between the different images in hue) caused by the temperature changes may be moderated for the HUD to display quality images.

The image shift caused by the temperature changes is described in this embodiment. Even under controlled conditions to stabilize a temperature in a usage environment of the HUD, however, the polarization direction of a laser beam used for image formation may differ from the direction which has been set to record the interference fringes in the volume hologram if the wavelength of the laser beam used for the image formation is different from the wavelength of the recording light used to record the interference fringes in the volume hologram according to the same reasons described above.

If an image is formed by deflecting different laser beams in hue to the same direction as that during the record of the interference fringes at a predetermined temperature (for example, the HUD 100A), laser sources have to emit laser beams with the same wavelength as that of the recording light used to record the interference fringes at the predetermined temperature, which results in a narrow range of usable wavelength. Accordingly, for example, use of an inexpensive semiconductor laser source as a light source for image formation may lead to deteriorated yield.

The range of usable wavelength may be enlarged according to the considerations of the inventor as described below.

For example, a wavelength of a laser beam emitted from each of semiconductor laser sources (n light source elements) is measured under a temperature condition of 25° C. These semiconductor laser sources are designed to generate different laser beams in wavelength ($\lambda 1, \lambda 2, \ldots, \lambda n$). Then, rates of shift between the measured wavelengths and recording light wavelengths ($\Lambda 1, \Lambda 2, \ldots, \Lambda n$) used to record the interference fringes in the volume hologram are calculated. The measured semiconductor laser sources having the calculated shift rates close to each other are combined with each other, so that the shift in diffraction angle of the different laser beams in wavelength ($\lambda 1, \lambda 2, \ldots, \lambda n$) with respect to the angle $\theta 2$ may be reduced. It should be understood that the wavelength $\Lambda 1$ is a wavelength of the recording light used to record the interference fringes for diffracting the wavelength $\lambda 1$ of the laser beam, which is used to form an image. The wavelength $\Lambda 2$ is a wavelength of the recording light used to record the interference fringes for diffracting the wavelength $\lambda 2$ of the laser beam, which is used to form the image. The wavelength $\Lambda n$ is a wavelength of the recording light used to record the interference fringes for diffracting the wavelength $\lambda n$ of the laser beam, which is used to form the image.

The light wavelength emitted by the red laser source used to form interference fringes for diffracting a laser beam with a red hue is represented by the symbol "$\Lambda r$" in the following descriptions. The light wavelength emitted by the green laser source used to form interference fringes for diffracting a laser beam with a green hue is represented by the symbol "$\Lambda g$" in the following descriptions. A light wavelength emitted by the blue laser source used to form interference fringes for diffracting a laser beam with a blue hue is represented by the symbol "$\Lambda b$" in the following descriptions.

The wavelength of the red laser beam LB(r) emitted by the red semiconductor laser source 110R mounted on the HUD 100A is represented by the symbol "$\lambda r$" in the following descriptions. The wavelength of the green laser beam LB(g) emitted by the green semiconductor laser source 110G mounted on the HUD 100A is represented by the symbol "$\lambda g$" in the following descriptions. The wavelength of the blue laser beam LB(b) emitted by the blue semiconductor laser source 110B mounted on the HUD 100A is represented by the symbol "λb" in the following descriptions.

If the red, green and blue semiconductor laser sources 110R, 110G, 110B are selected so that dimensionless numbers calculated on the basis of the following equations (2) to (4) are close to each other, the shifts in diffraction angle of the red, green and blue laser beams LB(r), LB(g), LB(b) from the angle θ2 are substantially equivalent to each other. Accordingly, the relative shift among the red, green and blue images at a predetermined temperature may be reduced.

[Equation 2]

$$(\lambda r - \Lambda r)/\Lambda r \quad (2)$$

[Equation 3]

$$(\lambda g - \Lambda g)/\Lambda g \quad (3)$$

[Equation 4]

$$(\lambda b - \Lambda b)/\Lambda b \quad (4)$$

More specifically, if a difference between a maximum value and a minimum value among $(\lambda r-\Lambda r)/\Lambda r$, $(\lambda g-\Lambda g)/\Lambda g$, and $(\lambda b-\Lambda b)/\Lambda b$ is 0.005 or less, the driver DR may perceive little relative shift among the red, green and blue images at the predetermined temperature.

For example, if Λr=637 nm, Λg=532 nm, and Λb=445 nm, and λr=640 nm, λg=534 nm, and λb=448 nm at 25° C., the values of $(\lambda r-\Lambda r)/\Lambda r$, $(\lambda g-\Lambda g)/\Lambda g$, and $(\lambda b-\Lambda b)/\Lambda b$ are 0.0047, 0.0038, and 0.0067, respectively. The minimum value of these dimensionless numbers is 0.0038. The maximum value is 0.0067. Therefore, the difference value between the maximum and minimum values is 0.0067−0.0038=0.0029. Accordingly, the difference between the maximum and minimum values of the dimensionless numbers obtained by the combination of the red, green and blue semiconductor laser sources 110R, 110G, 110B is 0.005 or less. Therefore, the driver DR may perceive little relative shift among the red, green and blue images under the temperature condition of 25° C.

As described above, the relative shift among images formed with different hues may be reduced as a result of combining semiconductor laser sources so that dimensionless numbers defined by the above equations (2) to (4) are set within a predetermined range.

Even if an HUD has several light sources emitting different light in wavelength (e.g. the HUD 100A described with reference to FIG. 4), the relative shift among different images in hue may be reduced by an appropriate combination of the light source elements on the basis of wavelength data measured at a predetermined temperature. In addition, if a relationship with a linear expansion coefficient is set so as to satisfy the relationship defined by the aforementioned equation (1), the HUD may display an image with little color shift regardless of temperature changes.

In this embodiment, the temperature of 25° C. is exemplified as the predetermined temperature. Alternatively, wavelength data measured at another temperature may be used to determine a combination of the light source elements.

The values of λr, λg, λb, Λr, Λg, and Λb are mentioned above by way of example only, and so other wavelength values may be used. The descriptions above are principally made on three light source elements of three different colors. However, the number of used light source elements may be two or greater than three. Hues of light emitted by the light source elements are not limited to red, green and blue, but light of other hues may be emitted by the light source elements.

In the aforementioned descriptions, the semiconductor laser source is exemplified as the light source having wavelength dependency. However, another type of light source having similar wavelength dependency may be incorporated in the HUD.

(Temperature Control for Laser Source)

The HUD 100 may be provided with an adjuster configured to adjust a temperature of the laser source 110. Likewise, the HUD 100A may be provided with adjusters to adjust the temperatures of the red, green and blue semiconductor laser sources 110R, 110G, 110B, respectively.

In the following descriptions about the temperature control for the laser source, the volume hologram has a linear expansion coefficient α of $2.0 \times 10^{-4}/°$ C. as described with reference to the graph of FIG. 3. The temperature dependency K of the wavelength of a laser beam emitted by the semiconductor laser source is 0.2 nm/° C.

For example, if the temperature around the volume hologram 200 of the HUD 100 is 50° C., the interference fringe interval Γ becomes wider by 0.005 times of the interference fringe interval than if the temperature is 25° C. In this case, if the temperature around the semiconductor laser source used as the laser source 110 is adjusted to about 41° C., the emitted laser beam LB has a longer wavelength by about 0.005 times of the wavelength than the wavelength of the laser beam LB at 25° C.

If the wavelength of a laser beam emitted by a laser source has a temperature dependency like the aforementioned semiconductor laser source, it is preferable that the temperature of the laser source is determined on the basis of the linear expansion coefficient α of the volume hologram and the temperature dependency K of the laser beam wavelength. As a result, the shift from the Bragg condition may be reduced and it becomes less likely that the variation in diffraction angle or the reduced diffraction efficiency causes the deterioration in image quality such as positional shift of the image display or reduced luminance.

A semiconductor laser source with a temperature dependency to cause the wavelength shift to the longer wavelength side under a temperature rise is exemplified as the light source of the HUD. However, the temperature dependency is not limited to the one in which the wavelength shifts to the longer wavelength side under a temperature rise. The aforementioned advantageous effects may be obtained as long as the wavelength of the laser beam emitted by laser source has some sort of temperature dependency.

In the descriptions above, the value of $2.0 \times 10^{-4}/°$ C. is exemplified as the linear expansion coefficient α of the volume hologram. However, the aforementioned effects may be also obtained with other values of the linear expansion coefficient.

Figure 6:
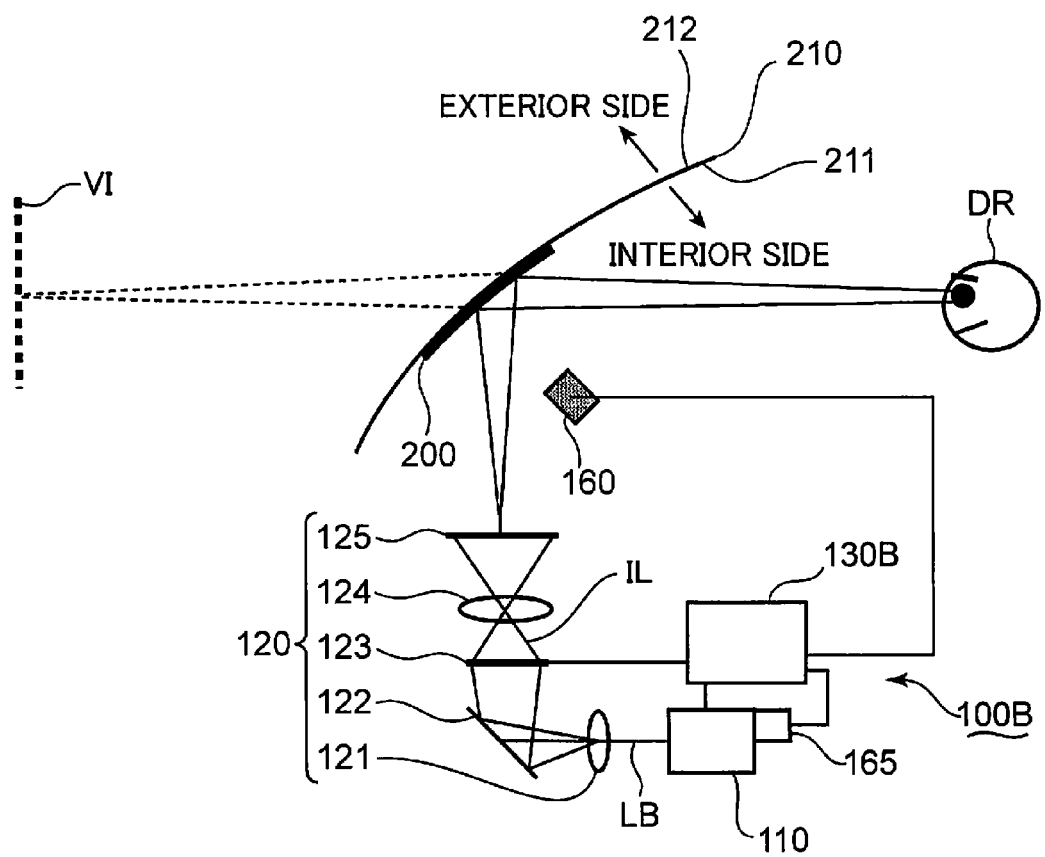
FIG. 6 is a schematic view of a head-up display having a temperature adjustment function for a laser source.

FIG. 6 is a schematic view of an HUD having temperature adjustment functions for the laser source. The HUD having the temperature adjustment functions are described with reference to FIG. 6.

The HUD 100B shown in FIG. 6 has the laser source 110, the projection optical system 120, and the volume hologram 200 like the HUD 100 described with reference to FIG. 1. The HUD 100B additionally has a temperature sensor 160 which measures a temperature of the volume hologram 200 itself and/or temperature around the volume hologram 200, and an adjuster 165 which adjusts a temperature of the laser source 110. The HUD 100B further comprises a controller 130B. Like the controller 130 described with reference to FIG. 1, the controller 130B is electrically connected to the laser source 110 and the liquid crystal panel 123. The controller 130B is also electrically connected to the temperature sensor 160 and the adjuster 165. In this embodiment, the controller 130B and the adjuster 165 are exemplified as the adjusters.

The temperature sensor 160 measures the temperature of the volume hologram 200 itself and/or the temperature around the volume hologram 200 to output temperature information about the measured temperature to the controller 130B. Based on the temperature information, the controller 130B sets a target temperature for a temperature of the laser source 110. The adjuster 165 adjusts the temperature of the laser source 110 under the control of the controller 130B so that the temperature of the laser source 110 becomes the target temperature.

Figure 7:
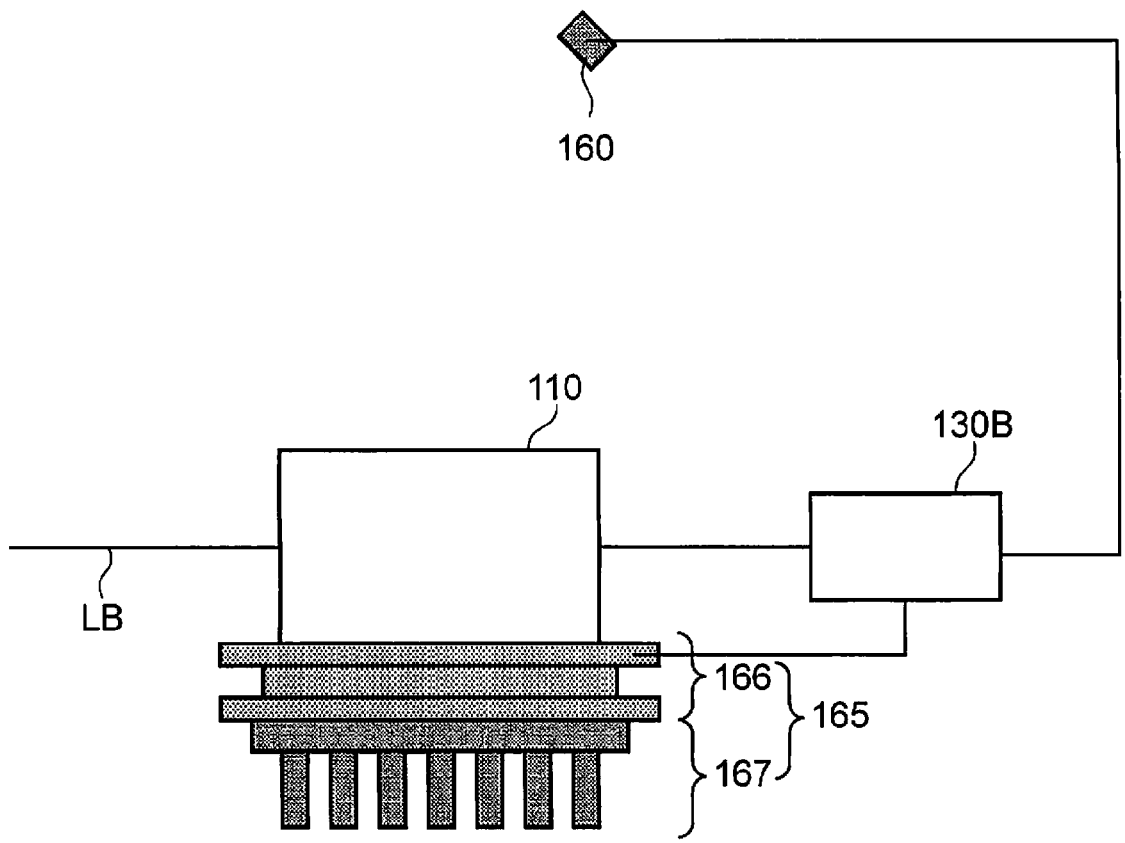
FIG. 7 is a schematic view of an adjuster of the head-up display shown in FIG. 6.

FIG. 7 is a schematic view of the adjuster 165. The adjuster 165 is described with reference to FIGS. 6 and 7.

The adjuster 165 includes a Peltier element 166 attached to the laser source 110, and a heatsink 167 attached to the Peltier element 166. The Peltier element 166 electrically connected to the controller 130B adjusts the temperature of the laser source 110 under the control of the controller 130B.

It is preferable to input information about the linear expansion coefficient α of the volume hologram 200 and the temperature dependency K of wavelength of the laser source 110 in advance in the controller 130B. Therefore, the controller 130B may appropriately set the target temperature for the laser source 110 substantially in real time on the basis of the temperature data from the temperature sensor 160.

A Peltier element is used as the adjuster 165 in this embodiment. Alternatively, another type of temperature adjuster (e.g. a heater, a fan, or a compressor) which may adjust the temperature of the laser source may be used. The temperature adjustment structure is not limited to the one shown in FIGS. 6 and 7. Other temperature adjustment techniques may be used to appropriately set temperature of the laser source on the basis of the linear expansion coefficient α of the volume hologram and the temperature dependency of a laser beam emitted by the laser source.

Figure 8:
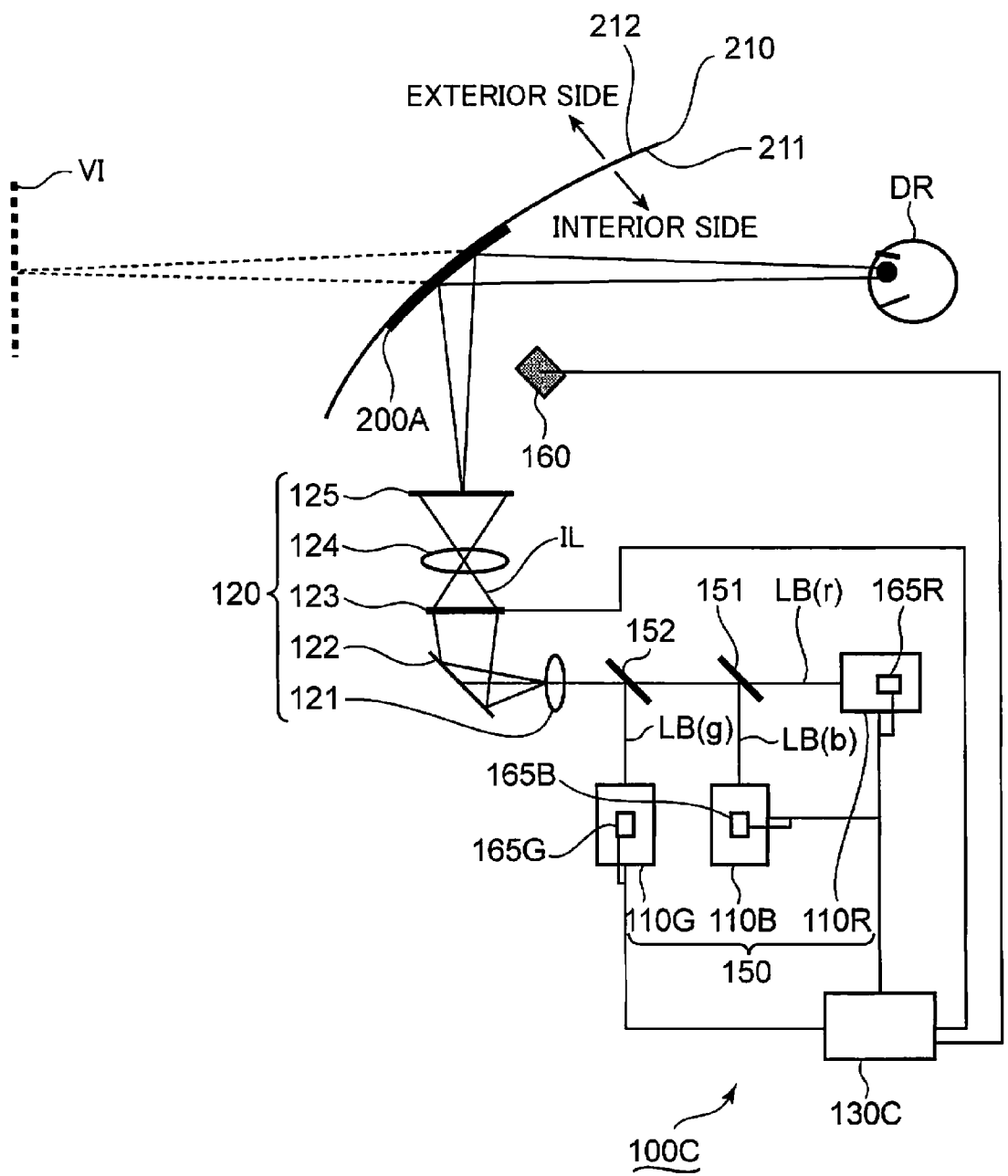
FIG. 8 is a schematic view of another head-up display having a temperature adjustment function for a laser source.

FIG. 8 is a schematic view of another HUD having temperature adjustment functions for the laser source. The HUD having the temperature adjustment functions are described with reference to FIG. 8.

The HUD 100C shown in FIG. 8 has the light source 150, the projection optical system 120 and the volume hologram 200A, like the HUD 100A described with reference to FIG. 4. The HUD 100C additionally comprises a temperature sensor 160 which measures a temperature of the volume hologram 200A itself and/or temperature around the volume hologram 200A, an adjuster 165R which adjusts a temperature of the red semiconductor laser source 110R, an adjuster 165G which adjusts a temperature of the green semiconductor laser source 110G, and an adjuster 165B which adjusts a temperature of the blue semiconductor laser source 110B. The HUD 100C further comprises a controller 130C. Like the controller 130A described with reference to FIG. 4, the controller 130C is electrically connected to the light source 150 and the liquid crystal panel 123. The controller 130C is also electrically connected to the temperature sensor 160 and the adjusters 165R, 165G, 165B. In this embodiment, the controller 130C and the adjusters 165R, 165G, 165B are exemplified as the adjusters.

The temperature sensor 160 measures the temperature of the volume hologram 200A itself and/or the temperature around the volume hologram 200A to output temperature information about the measured temperature to the controller 130C. Based on the temperature information, the controller 130C sets target temperatures for the red, green and blue semiconductor laser sources 110R, 110G, 110B, respectively. The adjusters 165R, 165G, 165B adjust temperatures of the red, green and blue semiconductor laser sources 110R, 110G, 110B, respectively, under the control of the controller 130C, so that the temperature values of the red, green and blue semiconductor laser sources 110R, 110G, 110B become the target temperature values, respectively.

The interference fringes for diffracting the red, green and blue laser beams LB(r), LB(g), LB(b) are recorded in the volume hologram 200A. Under a temperature condition of 25° C., the red semiconductor laser source 110R emits the red laser beam LB(r) with a wavelength that is substantially equal to the center wavelength of the recording light used to record the interference fringes for diffracting the red laser beam LB(r). The green semiconductor laser source 110G emits, under the temperature condition of 25° C., the green laser beam LB(g) with a wavelength that is substantially equal to the center wavelength of the recording light used to record the interference fringes for diffracting the green laser beam LB(g). The blue semiconductor laser source 110B emits, under the temperature condition of 25° C., the blue laser beam LB(b) with a wavelength that is substantially equal to the center wavelength of the recording light used to record the interference fringes for diffracting the blue laser beam LB(b).

For example, if the temperature around the light source 150 rises from a normal temperature, the controller 130C may set the target temperatures for the blue, green and red semiconductor laser sources 110B, 100G, 110R to about 35° C., about 37° C. and about 28° C., respectively. On the basis of the temperature condition of 25° C., the rates of wavelength variation of the red, green and blue laser beams LB(r), LB(g), LB(b) emitted by the light source 150 are all about 0.001 (see FIG. 5). Accordingly, the relative shift among red, green and blue images caused by the temperature changes may be reduced by individually setting the target temperatures for the red, green and blue semiconductor laser sources 110R, 110G, 110B, respectively, according to the temperature dependencies of the wavelengths of the red, green and blue laser beams LB(r), LB(g), LB(b) emitted by the light source 150. Thus, the HUD 100C may display quality images.

In the descriptions above, the target temperatures are set for the red, green and blue semiconductor laser sources 110R, 110G, 110B, respectively, so that the rate of the wavelength variation is about 0.001. Alternatively, the target temperature may be set for each of the red, green and blue semiconductor laser sources 110R, 110G, 110B on the basis of another value of the wavelength variation rate. For example, if the temperature measured by the temperature sensor 160 is relatively high, the target temperatures may be set to a higher value for the red, green and blue semiconductor laser sources 110R, 110G, 110B, respectively.

For example, the controller 130C may set the target temperatures for the blue, green and red semiconductor laser sources 110B, 110G, 110R to 47° C., 51° C. and 31° C., respectively. Alternatively, the controller 130C may set another combination of the target temperature values. If the target temperature values set by the controller 130C are increased or decreased in response to the temperature values measured by the temperature sensor 160, power consumed by the temperature adjustment for the red, green and blue semiconductor laser sources 110R, 110G, 110B may be reduced. Accordingly, the power consumption of the HUD 100C may be reduced.

As described above, the controller 130C adjusts the temperature of the light source 150 based not only on the linear expansion coefficient of the volume hologram 200A but also on the center wavelength of the recording light used to record the interference fringes in the volume hologram 200A and the light wavelength emitted by the light source 150 at a predetermined temperature. In the descriptions above, the wavelengths of the red, green and blue laser beams LB(r), LB(g), LB(b) from the light source 150 are set to be substantially equal at 25° C. to the center wavelength of the recording light used to record the interference fringes in the volume hologram 200A. If the wavelengths of the red, green and blue laser beams LB(r), LB(g), LB(b) are shifted, at 25° C., from the center wavelength of the recording light used to record the interference fringes in the volume hologram 200A, the controller 130C may also set the target temperatures for the wavelengths of the red, green and blue laser beams LB(r), LB(g), LB(b) at 25° C., respectively.

For example, if the wavelength of the red laser beam LB(r) emitted by the red semiconductor laser source 110R under a temperature condition of 25° C. is 638 nm, and the wavelength of the recording light used to record the interference fringes for diffracting the red laser beam LB(r) is 637 nm, and if the temperature measured by the temperature sensor 160 is 25° C., the controller 130C may set the target temperature for the temperature of the red semiconductor laser source 110R to a value lower by 5° C. (=1 (nm)/0.2 (nm/° C.)) than the temperature value of 25° C. This means that the target temperature set for the red semiconductor laser source 110R is 20° C. If the temperature measured by the temperature sensor 160 then varies, the controller 130C may set the target temperature for the red semiconductor laser source 110R on the basis of 20° C. In the same manner as described above, the controller 130C may set the target temperature for the other semiconductor laser sources (the green and blue semiconductor laser sources 110G, 110B).

In the descriptions above, the semiconductor laser source is exemplified as the laser source configured to emit a laser beam with wavelength having temperature dependencies. Alternatively, a light source configured to emit light with wavelength having similar temperature dependencies may be used.

Figure 9:
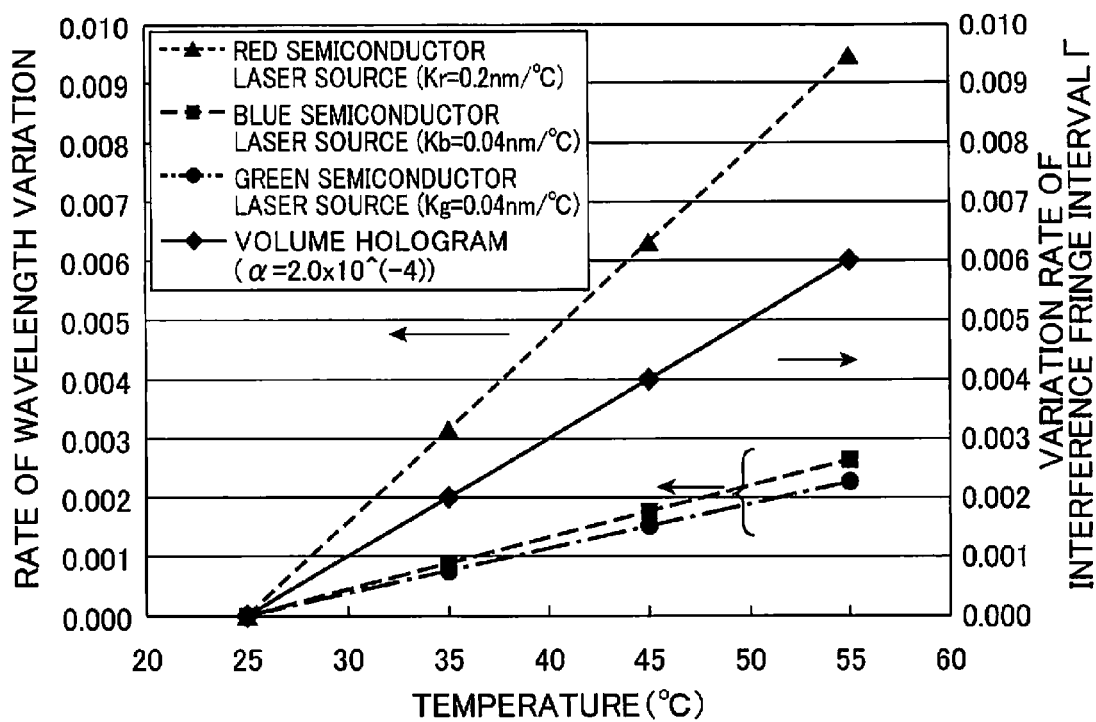
FIG. 9 is a graph schematically showing temperature expansion characteristics of the volume hologram and temperature dependency on laser beam wavelength.

FIG. 9 is a graph schematically showing temperature dependencies of the volume hologram and temperature expansion characteristics of laser beam wavelengths. The graph shown in FIG. 9 is obtained if the right-side vertical axis, which represents a variation rate of the interference fringe interval Γ of the volume hologram, is added to the graph shown in FIG. 5. The temperature expansion characteristics of the volume hologram and the temperature dependencies of laser beam wavelengths are described with reference to FIGS. 8 and 9.

In the following descriptions, like the foregoing descriptions, the linear expansion coefficient of the volume hologram 200A is 2×10$^{-4}$ (/° C.). The wavelength of a red laser beam used as the recording light to record the interference fringes in the volume hologram 200A is represented by the symbol "Λr (nm)". The wavelength of a green laser beam used as the recording light to record the interference fringes in the volume hologram 200A is represented by the symbol "Λg (nm)" in the following descriptions. The wavelength of a blue laser beam used as the recording light to record the interference fringes in the volume hologram 200A is represented by the symbol "Λb (nm)" in the following descriptions. The temperature dependency of wavelength of the red laser beam LB(r) from the red semiconductor laser source 110R mounted on the HUD 100C is represented by the symbol "Kr (nm/° C.)". The temperature dependency of wavelength of the green laser beam LB(g) from the green semiconductor laser source 110G mounted on the HUD 100C is represented by the symbol "Kg (nm/° C.)". The temperature dependency of wavelength of the blue laser beam LB(b) from the blue semiconductor laser source 110B mounted on the HUD 100C is represented by the symbol "Kb (nm/° C.)". The linear expansion coefficient of the volume hologram is represented by the symbol "α (/° C.)". If the relationship represented by the following equation (5) is satisfied, the shift from the Bragg condition caused by temperature changes may be reduced in comparison with if a light source having characteristics to emit a fixed wavelength, regardless of temperature changes. Therefore, it becomes less likely that the variation in diffraction angle or the decreased diffraction efficiency causes deterioration in image quality such as positional shift of the image display or reduction in luminance.

[Equation 5]

$$0 \leq Kn/\Lambda n \leq 2\alpha \ (n=r,g,b) \tag{5}$$

As seen from FIG. 9, for example, if the temperature around the volume hologram 200A is 35° C., the interference fringe interval Γ becomes wider by 0.002 times of the interference fringe interval than if it is 25° C. If the controller 130C sets the target temperatures for the red, blue and green semiconductor laser sources 110R, 110B, 110G to 32° C., 47° C. and 51° C., respectively, the shift from the Bragg condition may be cancelled. Accordingly, it becomes less likely that the variation in diffraction angle or the decreased diffraction efficiency causes deterioration in image quality such as positional shift of the image display or reduction in luminance. In addition, the relative shift among red, blue and green images may be also cancelled. Thus, the HUD 100C may display quality images.

For example, the temperature sensor 160 shown in FIG. 8 may be a radiation thermometer. Temperature information about a measured temperature is output from the radiation thermometer to the controller 130C. Thus, the temperature measured by the radiation thermometer is reflected on the temperature control of the red, green and blue semiconductor laser sources 110R, 110G, 110B. The temperature of the volume hologram 200A itself or the temperature around the volume hologram 200A may be measured by other measurement methods.

Figure 10:
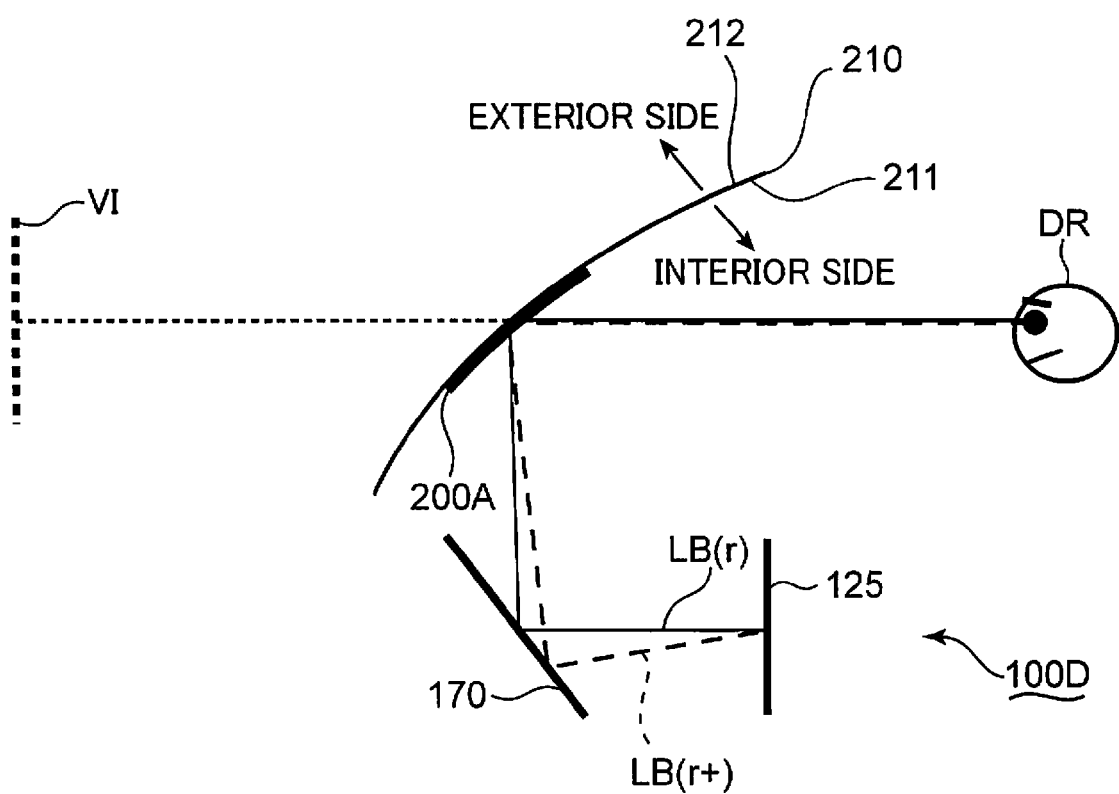
FIG. 10 is a schematic view of a head-up display having a function to reduce a relative shift among red, blue and green images.

FIG. 10 is a schematic view of an HUD having functions to reduce the relative shift among red, blue and green images. The HUD having the functions to reduce the relative shift among the red, green and blue images is described with reference to FIGS. 4 and 10.

The HUD 100D shown in FIG. 10 comprises substantially the same configurations as the HUD 100A described with reference to FIG. 4. Like the HUD 100A described with reference to FIG. 4, the HUD 100D comprises the volume hologram 200A, the light source 150, the controller 130A, the dichroic mirrors 151, 152, and the projection optical system 120. These elements are not shown in FIG. 10 in order to clarify the illustration. The screen 125 of the projection optical system 120 is shown in FIG. 10.

The HUD 100D further comprises a reflection-type hologram 170 situated between the screen 125 and the volume hologram 200A. In order to clarify the illustration, red laser beams LB(r), LB(r+) emitted from the screen 125 are shown in FIG. 10. In the following descriptions, the red laser beam LB(r) has the same wavelength as the recording light used to record the interference fringes in the volume hologram 200A. The red laser beam LB(r+) has a wavelength, which is shifted from the red laser beam LB(r) to the longer wavelength side, for example, by 5 nm.

The reflection-type hologram 170 has characteristics to cancel the wavelength dependencies of diffraction angle of the volume hologram 200A. As shown in FIG. 10, the red laser beams LB(r), LB(r+) are incident at different points on the reflection-type hologram 170. The reflection-type hologram 170 causes the red laser beams LB(r), LB(r+) incident at the different points thereof to be then incident substantially at the same point on the volume hologram 200A. As a result, the red laser beams LB(r), LB(r+) are emitted from the volume hologram 200A substantially at the same angle. Therefore, even if there are different laser beams in wavelength, little positional shift occurs between the images in a virtual image VI, so that a driver DR comfortably views the image without perceiving any positional shift between the images in the virtual image VI. The principles described above are applicable to the green and blue laser beams as well.

According to the principles described with reference to FIG. 10, for example, even if there is a change in ambient temperature, the relative positional shift among red, green and blue images may be cancelled. Therefore the HUD 100D may display quality images. If a reflection-type hologram having the aforementioned characteristics is used, the positional shift among the images is less likely to occur without temperature adjustment even if the wavelength of the laser beam from the light source of the HUD has temperature dependencies like a semiconductor laser source. Therefore, the HUD may display quality images.

Figure 11:
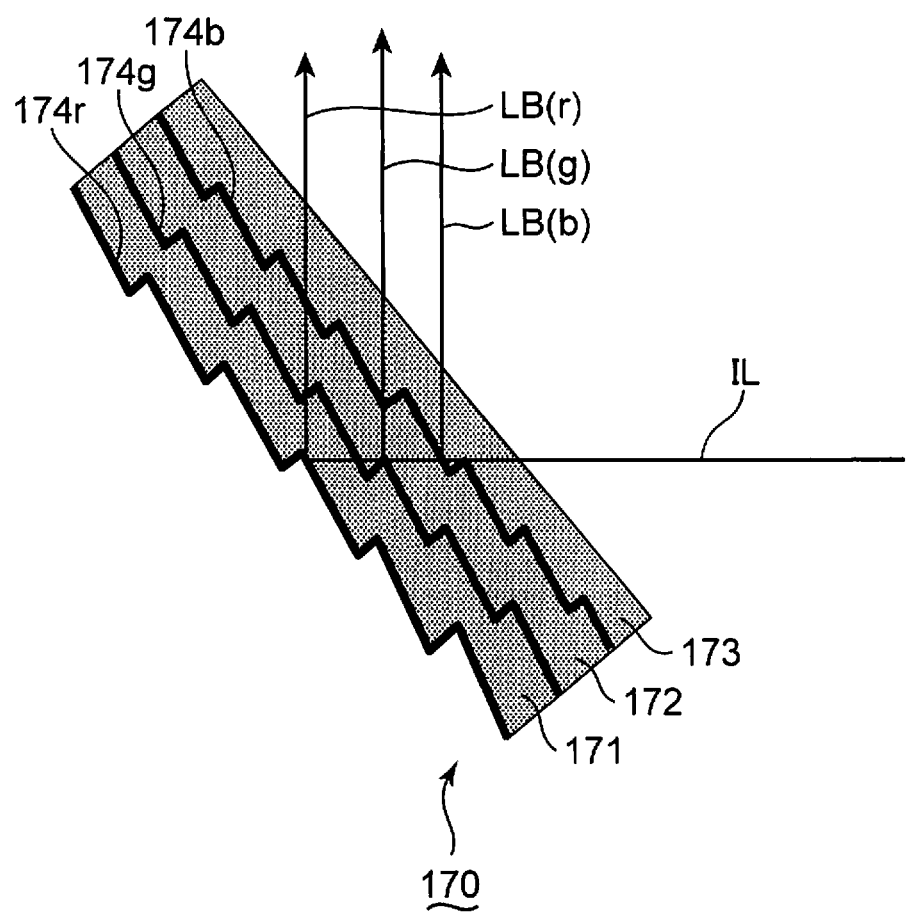
FIG. 11 is a schematic cross-sectional view of a reflection-type hologram of the head-up display shown in FIG. 10.

FIG. 11 is a schematic cross-sectional view of the reflection-type hologram 170. The reflection-type hologram 170 is described with reference to FIGS. 10 and 11.

The reflection-type hologram 170 shown in FIG. 11 is a relief hologram. A volume hologram may be used as the reflection-type hologram 170.

The reflection-type hologram 170 shown in FIG. 11 includes stacked resin material layers 171, 172, 173. The resin material layers 171, 172, 173 have substantially the same refractive indexes. Complementary surface reliefs (discontinuous corrugated surface patterns) are formed on the surfaces of the resin material layers 171, 172, 173. The surfaces of the resin material layers 171, 172, 173 having the surface reliefs formed thereon are in close contact with each other without any gap. A reflection coat 174r which reflects the red laser beam LB(r) is provided on the outer surface of the resin material layer 171. A reflection coat 174g which allows the red laser beam LB(r) to pass through but reflects the green laser beam LB(g) is provided between the resin material layers 171, 172. A reflection coat 174b which allows the red and green laser beams LB(r), LB(g) to pass through but reflects the blue laser beam LB(b) is provided between the resin material layers 172, 173.

For example, the reflection coats 174r, 174g, 174b shown in FIG. 11 are formed by deposition of dielectric multi-layers, respectively. However, the reflection coats 174r, 174g, 174b may be formed by other techniques. Alternatively, the reflection coat 174r may be a metal coat.

The relief structure of the closely attached interface between the resin material layers 171, 172 may be a blaze structure formed so that the green laser beam LB(g) may be efficiently diffracted to a desired direction. Likewise, the relief structure of the closely attached interface between the resin material layers 172, 173 may be a blaze structure formed so that the blue laser beam LB(b) may be efficiently diffracted to a desired direction. The relief structure formed on the outer surface of the resin material layer 171 may be also a blaze structure formed so that the red laser beam LB(r) may be efficiently diffracted to a desired direction.

The characteristics described with reference to FIG. 10 (characteristics to cancel the wavelength dependencies of diffraction angle of the volume hologram 200A) may be obtained by optimizing the relief structure (various dimensional parameters such as relief pitch, thickness and angle) of the resin material layers 171, 172, 173.

If the image light IL is incident on the reflection-type hologram 170, the red laser beam LB(r) of the image light IL passes through the reflection coats 174b, 174g and reaches the reflection coat 174r. The reflection coat 174r reflects and diffracts the red laser beam LB(r). As a result, the red laser beam LB(r) is emitted to a desired direction. The green laser beam LB(g) of the image light IL passes the reflection coat 174b and reaches the reflection coat 174g. The reflection coat 174g reflects and diffracts the green laser beam LB(g). As a result, the green laser beam LB(g) is emitted to a desired direction. Once the blue laser beam LB(b) of the image light IL reaches the reflection coat 174b, the reflection coat 174b reflects and diffracts the blue laser beam LB(b). As a result, the blue laser beam LB(b) is emitted to a desired direction.

If the reflection-type hologram 170 shown in FIG. 11 is used, for example, any relative positional shift among red, green and blue images may be cancelled even if the ambient temperature varies as described with reference to FIG. 10. Thus, the HUD 100D may display quality images.

In this embodiment, the relief hologram as shown in FIG. 11 is exemplified as the reflection-type hologram 170. Alternatively, another structure may be used as the reflection-type hologram 170 as long as it compensates the wavelength dependencies of diffraction angle of the volume hologram 200A.

(Arrangement of Volume Hologram)

Figure 12:
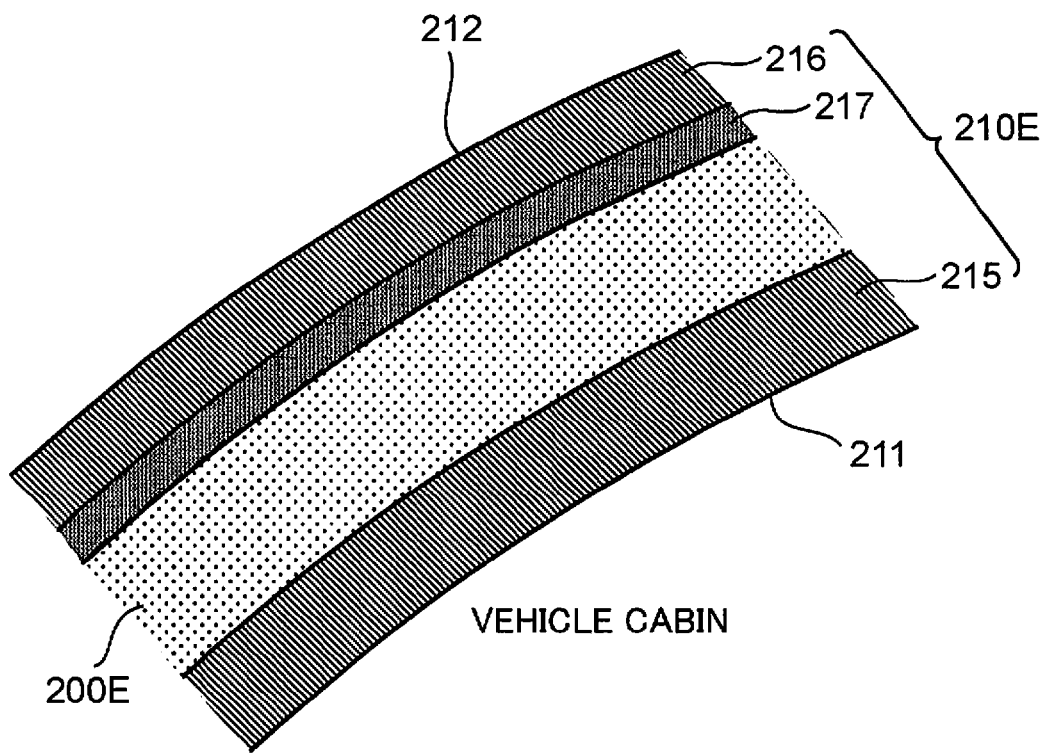
FIG. 12 is a schematic cross-sectional view of a windshield in which a volume hologram is incorporated.

FIG. 12 is a schematic cross-sectional view of a windshield in which a volume hologram incorporated. Arrangement of the volume hologram is described with reference to FIG. 12.

A windshield 210E of a vehicle typically has an inner glass layer 215 defining an inner surface 211, an outer glass layer 216 defining an outer surface 212, and an intermediate film 217 situated between the inner and outer glass layers 215, 216. The intermediate film 217 selectively adjusts the wavelength component of external light entering into the cabin. For example, the intermediate film 217 has absorption characteristics to absorb infrared or ultraviolet rays.

The volume hologram 200E shown in FIG. 12 is situated between the inner glass layer 215 and the intermediate film 217. The volume hologram 200E may typically have characteristics to absorb light in the infrared region. The intermediate film 217 often contains infrared-ray absorbing additives. Therefore, the volume hologram 200E is less likely to thermally expand if the volume hologram 200E is situated between the cabin (the inner glass layer 215) and the intermediate film 217 as shown in FIG. 12. Under the arrangement of the volume hologram 200E shown in FIG. 12, the infrared rays contained in the sunlight are less likely to cause a temperature rise and thermal expansion of the volume hologram 200E. The arrangement of the volume hologram 200E shown in FIG. 12 is applicable to the HUDs 100 to 100D, so that the HUDs 100 to 100D may display quality images.

If the temperature of the laser source is adjusted according to a temperature of the windshield like in the aforementioned HUDs 100B, 100C, the temperature rise of the volume hologram is thereby suppressed. Consequently, the temperature rise of the laser source is also suppressed, which results in little energy required for temperature adjustment.

Even with a light source such as a semiconductor laser source which shows a decrease in luminous efficiency under a high-temperature environment, it become less likely that the luminous efficiency is reduced by the temperature rise because the temperature rise of the volume hologram is suppressed. Therefore, the HUD preferably consumes less energy.

The volume hologram 200E shown in FIG. 12 is arranged between the inner glass layer 215 and the intermediate film 217. Alternatively, the volume hologram may be attached to the inner surface 211 of the inner glass layer 215.

If the intermediate film 217 has ultraviolet ray absorption characteristics, it becomes less likely that the volume hologram 200E is deteriorated by ultraviolet rays. Therefore, the arrangement of the volume hologram 200E described with reference to FIG. 12 lengthens the durability of the HUD.

Second Embodiment

Figure 13:
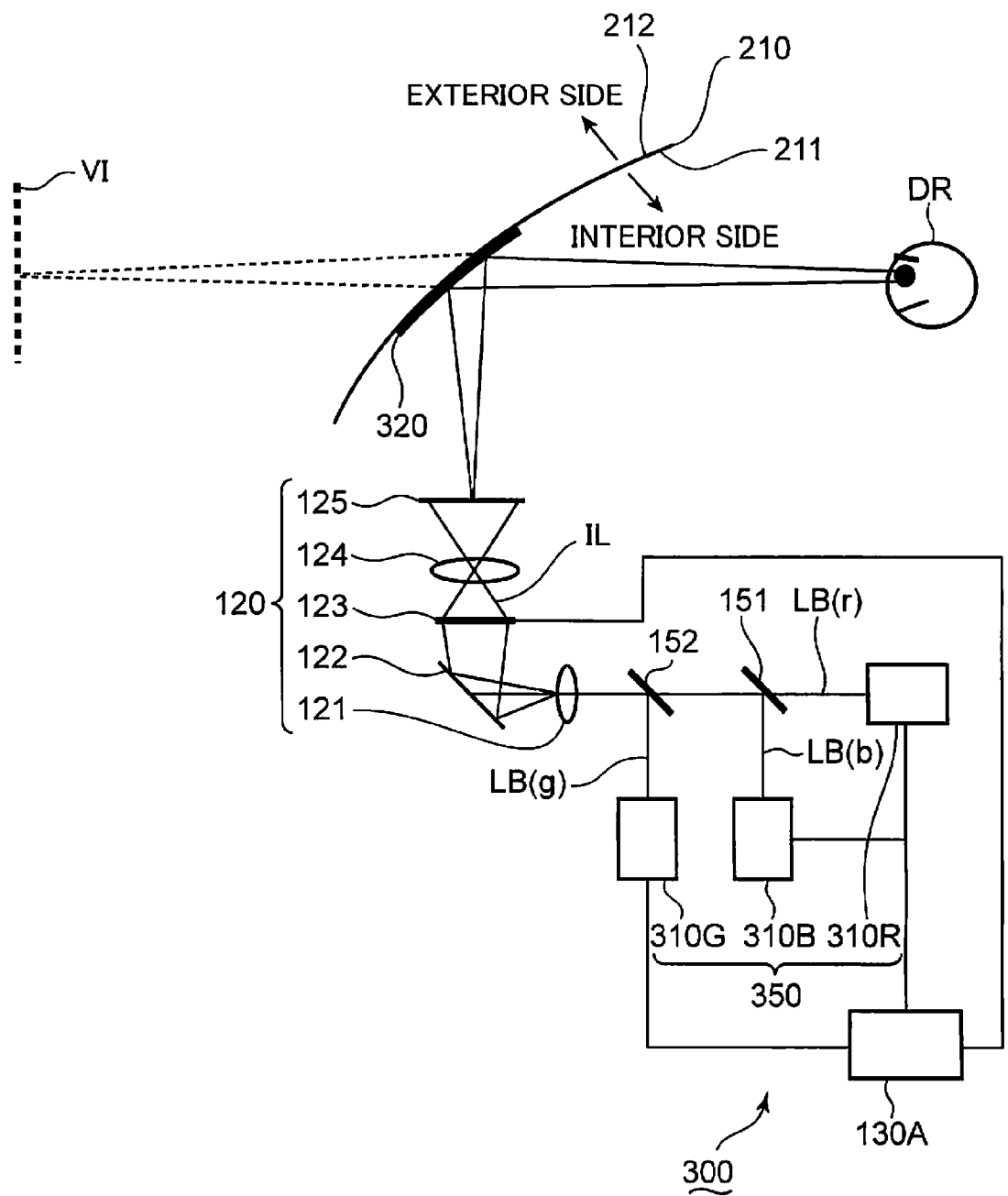
FIG. 13 is a schematic view of a head-up display exemplified as a see-through display according to the second embodiment.

FIG. 13 is a schematic view of an HUD exemplified as a see-through display according to the second embodiment. The HUD is described with reference to FIGS. 4 and 13.

The HUD 300 according to the second embodiment has the controller 130A, the dichroic mirrors 151,152, and the projection optical system 120, like the HUD 100A described with reference to FIG. 4. The HUD 300 also comprises a light source 350 including a red wavelength conversion laser source 310R, a green wavelength conversion laser source 310G and a blue wavelength conversion laser source 310B, and a volume hologram 320 attached to the inner surface 211 of the windshield 210. The red, green and blue wavelength conversion laser sources 310R, 310G, 310B are electrically connected to the controller 130A and operated under the control of the controller 130A.

The red wavelength conversion laser source 310R converts fundamental waves into higher harmonic waves by means of a wavelength conversion element to emit the red laser beam LB(r). The green wavelength conversion laser source 310G converts fundamental waves into higher harmonic waves by means of a wavelength conversion element to emit the green laser beam LB(g). The blue wavelength conversion laser source 310B converts fundamental wave into higher harmonic waves by means of a wavelength conversion element to emit the blue laser beam LB(b).

Unlike the HUD 100A described with reference to FIG. 4, the HUD 300 has wavelength conversion laser sources as the light source instead of semiconductor laser sources. Descriptions of other elements are in common with that for the HUD 100A, and therefore the descriptions for the HUD 100A are incorporated in the descriptions of the HUD 300.

Figure 14A:
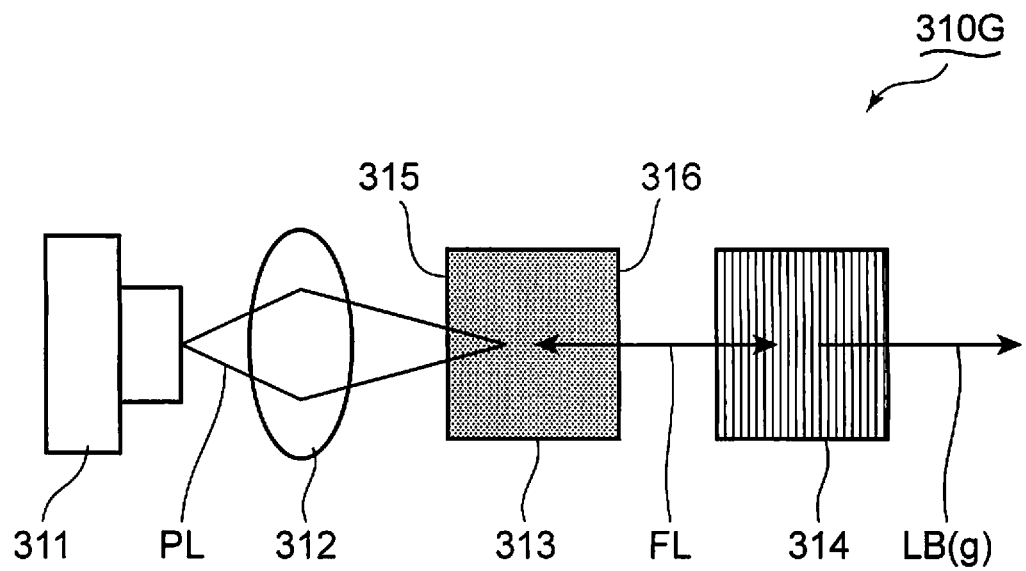
FIG. 14A is a schematic view of a green wavelength conversion laser source.

FIG. 14A is a schematic view of the green wavelength conversion laser source 310G. The green wavelength conversion laser source 310G is described with reference to FIGS. 13 and 14A. The following descriptions of the green wavelength conversion laser source 310G is similarly applicable to the red and blue wavelength conversion laser sources 310R, 310B.

The green wavelength conversion laser source 310G has an excitation semiconductor laser source 311 which emits an excited laser beam PL, a condenser lens 312, a solid-state laser crystal 313, and a wavelength conversion element 314. The excited laser beam PL emitted by the semiconductor laser source 311 is condensed by the condenser lens 312 and enters the solid-state laser crystal 313.

In order to obtain the green laser beam LB(g), the semiconductor laser source 311 incorporated in the green wavelength conversion laser source 310G typically emits the excited laser beam PL having a center wavelength of about 808 nm in accordance with the wavelength absorbed by the solid-state laser crystal 313.

The solid-state laser crystal 313 may be typically formed of YAG (composite oxide of yttrium (Y) and aluminum (Al) doped with neodymium (Nd)) or $YVO_4$ (composite oxide of yttrium (Y) and vanadium (V) doped with neodymium (Nd)). The solid-state laser crystal 313 formed of YAG or $YVO_4$ emits fundamental wave light FL with a wavelength of about 1064 nm.

The solid-state laser crystal 313 includes an entrance surface 315 into which the excited laser beam PL enters and an emission surface 316 opposite to the entrance surface 315. In general, a resonator is formed between the entrance surface 315 and the emission surface 316 to cause laser-oscillation of the fundamental wave light FL with a wavelength of about 1064 nm.

The wavelength conversion element 314 may be typically formed of lithium niobate ($LiNbO_3$) doped with magnesium oxide. A polarization-inverted structure is formed in the wavelength conversion element 314.

The fundamental wave light FL entering the wavelength conversion element 314 is converted into the second higher harmonic wave light with a wavelength of 532 nm corresponding to a half the wavelength of the fundamental wave light FL, in the wavelength conversion element 314. The second higher harmonic wave light is emitted by the wavelength conversion element 314 as the green laser beam LB(g).

The oscillation wavelength of the green laser beam LB(g) is principally determined on the basis of a peak wavelength of the solid-state laser crystal 313. The peak wavelength of the solid-state laser crystal 313 typically varies only by about 0.01 nm/° C. Accordingly, the wavelength of the green laser beam LB(g) varies only by about 0.005 nm/° C. This means that there are few changes in oscillation wavelength of the green wavelength conversion laser source even if the ambient temperature varies. If the red and blue wavelength conversion laser sources 310R, 310B have the same configurations, their variations in oscillation wavelength become very small even if the ambient temperature varies.

As described in the context of the first embodiment, the volume hologram 320 expands or contracts under a change in temperature around the HUD 300. In the present embodiment, however, there are few changes in wavelengths of the red, green and blue laser beams LB(r), LB(g), LB(b) incident on the volume hologram 320. If the temperature around the volume hologram 320 rises to expand the volume hologram 320, the diffraction angles of the red, green and blue laser beams LB(r), LB(g), LB(b) vary. However, since the variation amounts of the diffraction angles of the red, green and blue laser beams LB(r), LB(g), LB(b) are the same, the relative shift of display positions of red, green and blue images becomes very small even though the display positions of the images vary. Therefore, the HUD 300 may display quality images.

Figure 14B:
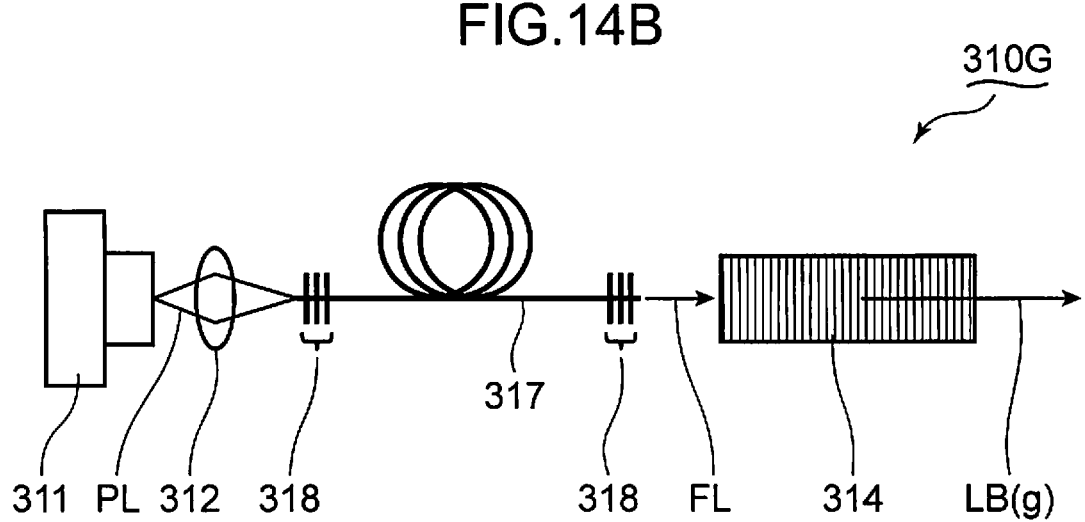
FIG. 14B is a schematic view of a green wavelength conversion laser source having another configuration.

FIG. 14B is a schematic view of a green wavelength conversion laser source 310G having other configurations. The green wavelength conversion laser source 310G is described with reference to FIGS. 13 to 14B. The following descriptions of the green wavelength conversion light source 310G is also applicable to the red and blue wavelength conversion laser sources 310R, 310B.

A light source in which a fiber laser is incorporated to generate the fundamental wave light may be used as the green wavelength conversion laser source 310G instead of the light source having the solid-state laser crystal excited by the excited laser beam PL from the semiconductor laser source 311. FIG. 14B schematically shows the green wavelength conversion laser source 310G in which the fiber laser is incorporated.

The green wavelength conversion laser source 310G has an excitation semiconductor laser source 311, which emits an excited laser beam PL, a condenser lens 312, and a fiber laser 317. The excited laser beam PL emitted by the semiconductor laser source 311 is condensed by the condenser lens 312 and enters the fiber laser 317.

The fiber laser 317 typically has a double-clad structure. For example, the fiber laser 317 typically has a core doped with ytterbium (Yb). An inner clad portion is typically formed of quartz. The excited laser beam PL is usually traveled through the inner clad portion. The excited laser beam PL propagated through the inner clad portion excites Yb contained in the core.

A fiber grating 318 is formed near both ends of the fiber laser 317. Only light with a specific wavelength determined by the fiber grating 318 among infrared rays generated by the excitation of Yb selectively resonates in the core of the fiber laser 317 and is emitted by the fiber laser 317 as the fundamental wave light FL.

The green wavelength conversion laser source 310G has a wavelength conversion element 314. Typically, the wavelength conversion element 314 may be lithium niobate ($LiNbO_3$) doped with magnesium oxide. A polarization-inverted structure is formed in the lithium niobate ($LiNbO_3$).

If the fundamental wave light FL emitted by the fiber laser 317 has a wavelength of 1064 nm, the wavelength conversion element 314 generates a green laser beam LB(g) having a wavelength of 532 nm as the second higher harmonic wave light, as described with reference to FIG. 14A. The green laser beam LB(g) is emitted by the wavelength conversion element 314.

The wavelength of the fundamental wave light FL emitted by the fiber laser 317 is determined on the basis of the pitch of the fiber grating 318. The core of the fiber laser 317 is usually formed of quartz, as described above. The quartz has a linear expansion coefficient of about $6 \times 10^{-7}$. Therefore, there are few changes in wavelength of the fundamental wave light FL emitted by the fiber laser 317, in spite of the ambient temperature variation. Since the wavelength variation of the fundamental wave light FL is very small regardless of the ambient temperature variation, there are also few changes in wavelength of the green laser beam LB(g) emitted as the second higher harmonic wave light of the fundamental wave light FL in spite of the ambient temperature variation.

If the optical configurations described with reference to FIG. 14 is applied to the red and blue wavelength conversion laser sources 310R, 310B, there are few changes in not only wavelength of the green laser beam LB(g) but also the wavelengths of the red and blue laser beams LB(r), LB(b) in spite of the ambient temperature variation. Therefore, if a wavelength conversion laser source in which a fiber laser is used as a light source to cause the fundamental wave light is used in the HUD 300, the relative positional shift among red, green and blue images is very small regardless of the ambient temperature variation. Therefore, the HUD 300 may display quality images.

The principles of the second embodiment is applicable to a see-through display having a light source including n (n is an integer greater than 1) light source elements. If there are few changes in wavelengths of the n light source elements regardless of the ambient temperature variation, it becomes less likely that the relative positional shift occurs among images formed with light emitted by these n light source elements, regardless of the ambient temperature variation.

If the wavelengths of light emitted by the n light source elements have the same level of the temperature dependency, the aforementioned principles are applicable in the same manner.

In the following descriptions, the wavelength of the recording light (laser beam) used to record interference fringes in the volume hologram 320 for diffracting the red laser beam LB(r) is represented by the symbol "Λr (nm)". The wavelength of the recording light (laser beam) used to record interference fringes in the volume hologram 320 for diffracting the green laser beam LB(g) is represented by the symbol "Λg (nm)". The wavelength of the recording light (laser beam) used to record interference fringes in the volume hologram 320 for diffracting the blue laser beam LB(b) is represented by the symbol "Λb (nm)". The wavelength dependency of the red laser beam LB(r) emitted by the red wavelength conversion laser source 310R is represented by the symbol "Kr (nm/° C.)". The wavelength dependency of the green laser beam LB(g) emitted by the green wavelength conversion laser source 310G is represented by the symbol "Kg (nm/° C.)". The wavelength dependency of the blue laser beam LB(b) emitted by the blue wavelength conversion laser source 310B is represented by the symbol "Kb (nm/° C.)".

As long as a difference between the maximum and minimum values among Kr/Λr, Kg/Λg, and Kb/Λb is 0.0001 or less, the driver DR is less likely to perceive relative positional shift among the red, green and blue images regardless of the ambient temperature variation. Therefore, the HUD 300 may display quality images.

In this embodiment, a light source having a solid-state laser source to generate the fundamental wave light and a light source having a fiber laser to generate the fundamental wave light are exemplified as the wavelength conversion laser source. Alternatively, another light source having configurations to cause few changes in wavelength of the fundamental wave light regardless of the ambient temperature variation may be used as the light source elements.

Figure 15:
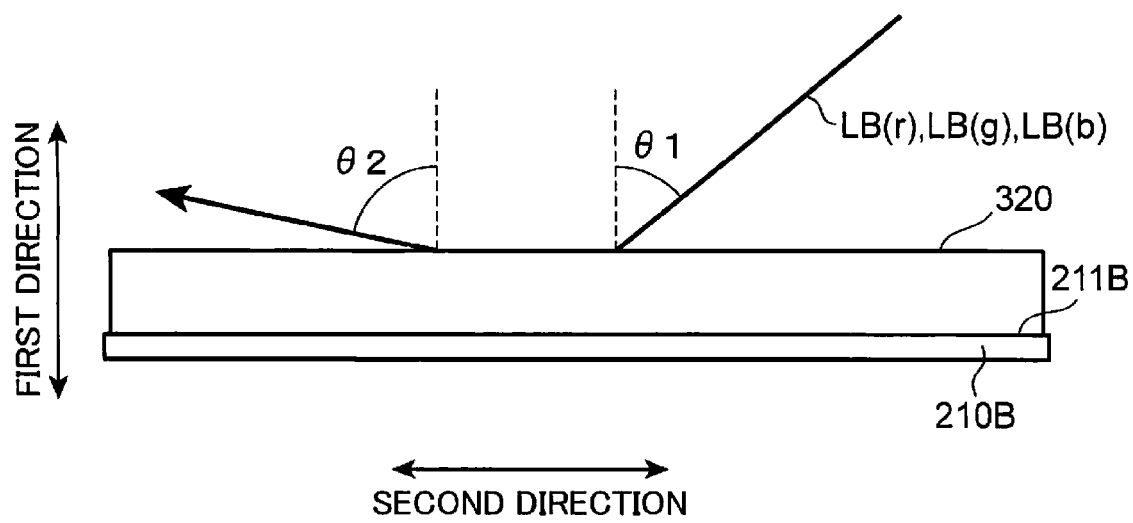
FIG. 15 is a schematic cross-sectional view of a volume hologram fixed on a substrate.

FIG. 15 is a schematic cross-sectional view of the volume hologram 320 fixed on a substrate. Further advantageous effects of the second embodiment are described with reference to FIGS. 13 and 15.

FIG. 15 shows a substrate 210B including a flat upper surface 211B on which the volume hologram 320 is fixed. FIG. 15 also shows a first direction which is perpendicular to the upper surface 211B and a second direction which is parallel to the upper surface 211B.

In the following descriptions, the linear expansion coefficient of the substrate 210B is represented by the symbol "β (/° C.)". The linear expansion coefficient of the volume hologram 320 is represented by the symbol "α (/° C.)". If the substrate 210B is a glass plate, the linear expansion coefficient β is typically about $8 \times 10^{-6}$ (/° C.). The linear expansion coefficient α of the volume hologram 320 is typically about $2 \times 10^{-4}$ (/° C.).

In general, the volume hologram 320 is much softer than the substrate 210B such as a glass plate. Therefore, even if the ambient temperature varies, the amplitude of expansion or contraction of the volume hologram 320 in the second direction does not exceed the amplitude of expansion or contraction of the substrate 210B in the second direction. However, the volume hologram 320 may freely expand or contract in the first direction.

Under the condition that the volume hologram 320 expands or contracts only in the first direction (that is, the volume hologram 320 does not expand or contract in the second direction), without changes in angle θ1 and wavelength of the laser beams (the red, green and blue laser beam LB(r), LB(g), LB(b)) incident on the volume hologram 320, there are few changes in angle θ2 at which the laser beam is emitted even if the volume hologram 320 expands or contracts in the first direction. Accordingly, if the linear expansion coefficient β of the substrate 210B is smaller than the linear expansion coefficient α of the volume hologram 320, there are few changes in angle θ2 at which the laser beam is emitted by the volume hologram 320 even if the ambient temperature varies. If the linear expansion coefficient β of the substrate 210B is set to be smaller than the linear expansion coefficient α of the volume hologram 320, the image display position is less likely to shift even if the ambient temperature varies. Thus, the HUD 300 may display quality images.

In this second embodiment, a glass plate is exemplified as the substrate 210B. Alternatively, another material having a smaller linear expansion coefficient β than the linear expansion coefficient α of the volume hologram 320 may be used as the substrate 210B. For example, polycarbonate ($\beta=7\times10^{-5}$) or acryl ($\beta=7.5\times10^{-5}$) may be used as the substrate. The windshield 210 shown in FIG. 13 also serves as the substrate. Accordingly, as shown in FIG. 13, the volume hologram 320 attached to the windshield 210 provides the same effects as those described with reference to FIG. 15.

Third Embodiment

Although the temperature dependency of light wavelength emitted by the light source is taken into consideration in the principles of the first embodiment, the principles of the present embodiment are applicable without any limitation to the temperature dependency of the light emitted by a light source.

Figure 16:
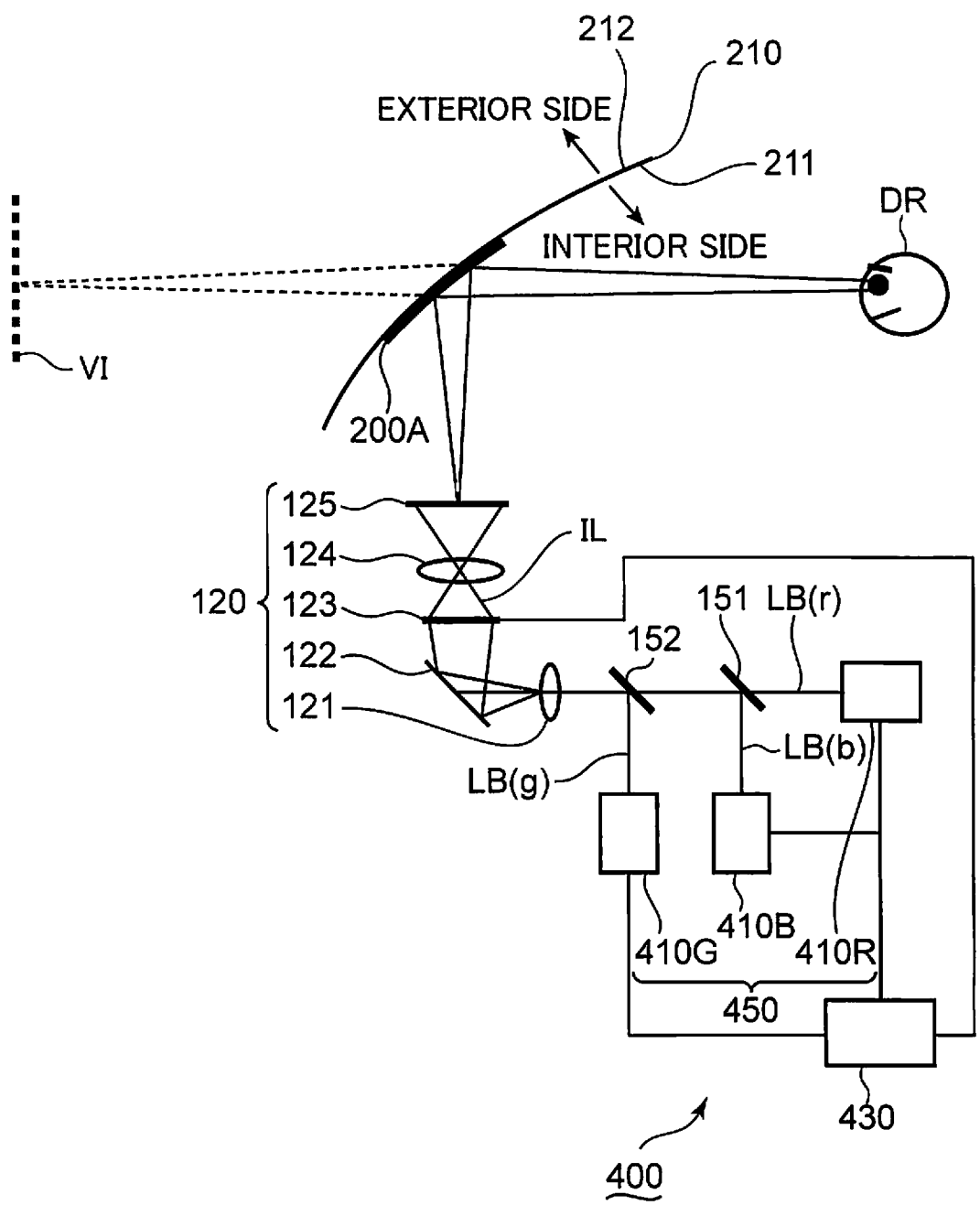
FIG. 16 is a schematic view of a head-up display exemplified as a see-through display according to the third embodiment.

FIG. 16 is a schematic view of an HUD exemplified as a see-through display according to the third embodiment. The HUD is described with reference to FIGS. 4 and 16.

The HUD 400 according to the third embodiment comprises the dichroic mirrors 151, 152, the projection optical system 120 and the volume hologram 200A, like the HUD 100A shown in FIG. 4. The HUD 400 further comprises a light source 450 including a red laser source 410R, a green laser source 410G and a blue laser source 410B, and a controller 430. The controller 430 is electrically connected to the liquid crystal panel 123, the red, green and blue laser sources 410R, 410G, 410B. The liquid crystal panel 123, the red, green and blue laser sources 410R, 410G, 410B are operated under the control of the controller 430. The red, green and blue laser sources 410R, 410G, 410B may be semiconductor laser sources as described in the context of the first embodiment. Alternatively, the red, green and blue laser sources 410R, 410G, 410B may be wavelength conversion laser sources as described in the context of the second embodiment. Yet alternatively, the light source 450 may be formed of a combination of a semiconductor laser source and a wavelength conversion laser source. Yet alternatively, another laser source may be used as the light source 450.

The red, green and blue laser sources 410R, 410G, 410B emit the red, green and blue laser beams LB(r), LB(g), LB(b) under the control of the controller 430. In this embodiment, one of the red, green and blue laser sources 410R, 410G, 410B is exemplified as the first light source element, and the other is exemplified as the second light source element. One of the red, green and blue laser beams LB(r), LB(g), LB(b) is exemplified as the first light, and the other of them is exemplified as the second light.

Figure 17:
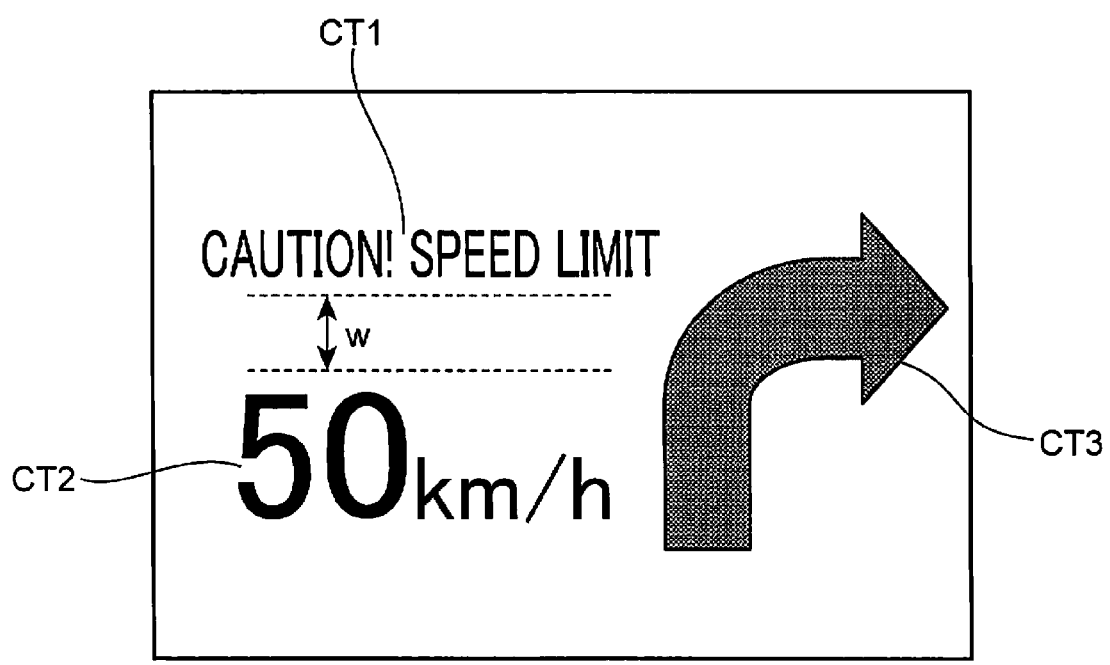
FIG. 17 is a schematic view of display content displayed by the head-up display shown in FIG. 16.

FIG. 17 is a schematic view of a display content displayed by the HUD 400. The display content is described with reference to FIGS. 16 and 17.

The controller 430 controls the light source 450 and the liquid crystal panel 123, so that the display content containing a Warning content CT1, a Speed content CT2, and a Guidance content CT3 is displayed. As shown in FIG. 17, the controller 430 controls the liquid crystal panel 123 to vertically separate the Warning content CT1 and the Speed content CT2 from each other by a predetermined distance "W". The controller 430 controls the liquid crystal panel 123 to horizontally separate the Warning content CT1 and the Speed content CT2 from the Guidance content CT3, so that these contents do not overlap with each other.

In this embodiment, the Warning content CT1 is depicted with the red laser beam LB(r). The Speed content CT2 is depicted with the green laser beam LB(g). The Guidance content CT3 is depicted with the blue laser beam LB(b). In this embodiment, one of the Warning content CT1, the Speed content CT2 and the Guidance content CT3 is exemplified as the first image, and the other is exemplified as the second image.

Since the Warning content CT1, the Speed content CT2 and the Guidance content CT3 do not overlap in the display content, as described above, the HUD 400 may display the display content without mixing of the red, green and blue laser beams LB(r), LB(g), LB(b). Accordingly, even if the emission angles of the red, green and blue laser beams LB(r), LB(g), LB(b) from the volume hologram 200A vary in accordance with environmental variation such as variation in the ambient temperature, the driver DR may not perceive the positional changes of the Warning content CT1, the Speed content CT2 and the Guidance content CT3 as the color shift.

As shown in FIG. 17, the Warning content CT1 and the Speed content CT2, which are vertically aligned, are separated by the predetermined distance "W". Therefore, even if the positions of the Warning content CT1 and the Speed content CT2 vary relative to each other due to the temperature changes, the Warning content CT1 and the Speed content CT2 are less likely to overlap with each other. Accordingly, the HUD 400, with various types of light source elements, may display an image which is hardly perceived as a color shift. Thus, a quality image may be displayed to the driver DR.

In this embodiment, three types of images (the Warning content CT1, the Speed content CT2 and the Guidance content CT3) are exemplified as the display content. Alternatively, the HUD may display an image of other contents, and/or more or less types of images. For example, if the HUD creates a display content with four hues, four types of laser sources are used. If a hue (e.g. yellow) other than red, green and blue hues is used to display an image, a yellow laser source may be used as the light source. If a combination of light sources having substantially the same temperature dependency of wavelength is used, the colors represented by these light sources may be represented by mixture of colors.

Fourth Embodiment

Figure 18A:
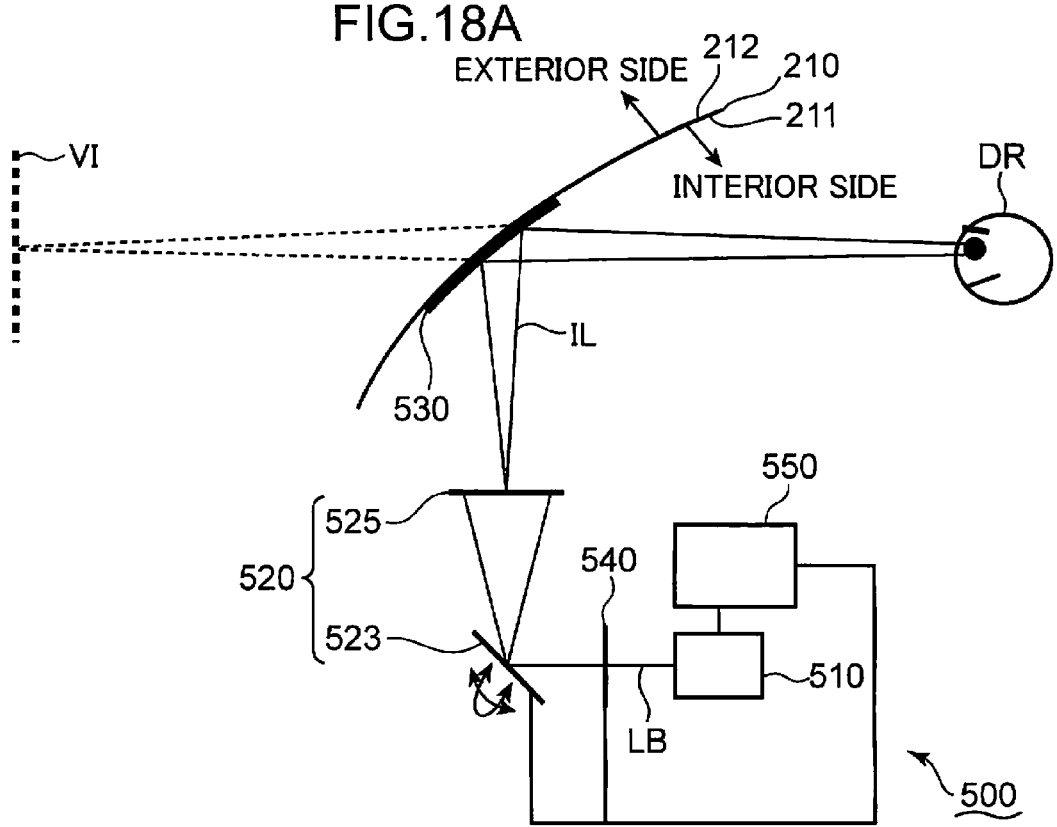
FIG. 18A is a schematic view of a head-up display exemplified as a see-through display according to the fourth embodiment.

FIG. 18A is a schematic view of an HUD exemplified as a see-through display according to the fourth embodiment of the invention. The HUD according to the fourth embodiment is described with reference to FIG. 18A.

The HUD 500 according to the fourth embodiment comprises a laser source 510 which emits a laser beam LB, a projection optical system 520 which projects the laser beam LB emitted by the laser source 510, and a volume hologram 530 attached to the inner surface 211 of the windshield 210. The projection optical system 520 includes an MEMS mirror 523 and a screen 525. In this embodiment, the laser source 510 is exemplified as the light source configured to emit light.

The HUD 500 further comprises a ½ wavelength plate 540 situated between the laser source 510 and the MEMS mirror 523, and a controller 550 electrically connected to the laser source 510, the MEMS mirror 523 and the ½ wavelength plate 540. The laser source 510, the MEMS mirror 523 and the ½ wavelength plate 540 are operated under the control of the controller 550.

The laser source 510 emits a laser beam LB under the control of the controller 550. The laser beam LB passes through the ½ wavelength plate 540, and is reflected by the MEMS mirror 523 toward the volume hologram 530. The ½ wavelength plate 540 modulates the polarization direction of the laser beam LB before the laser beam LB is reflected by the MEMS mirror 523. In this embodiment, the ½ wavelength plate 540 is exemplified as the modulator.

The MEMS mirror 523 which is operated under the control of the controller 550 two-dimensionally scans the laser beam LB on the screen 525 to illuminate the screen 525. Meanwhile, the laser source 510 modulates the laser beam LB in synchronization with the scanning of the MEMS mirror 523, according to a displayed image, to display a desired image on the screen 525. After that, image light IL according to the image formed on the screen 525 is emitted from the screen 525 to the volume hologram 530. The volume hologram 530 diffracts the image light IL toward a driver DR, so that the driver DR may view a virtual image VI through the windshield 210.

Figure 18B:
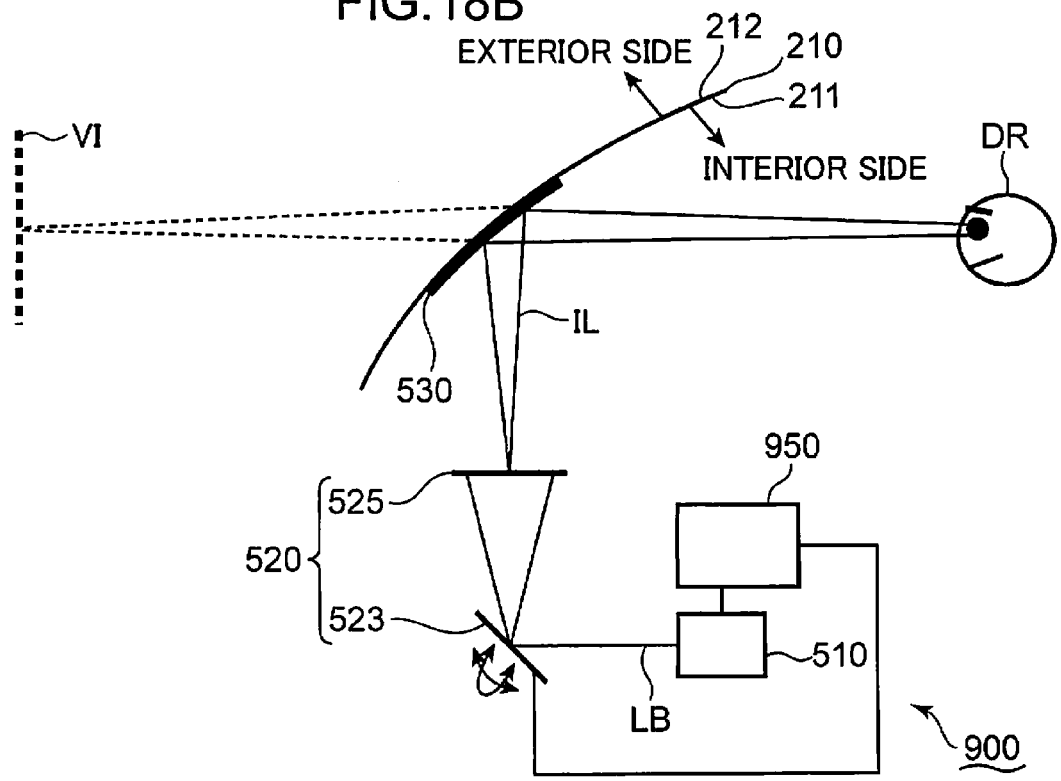
FIG. 18B is a schematic view of a head-up display without a ½ wavelength plate.

FIG. 18B is a schematic view of an HUD without the ½ wavelength plate 540. The HUD without the ½ wavelength plate 540 is described with reference to FIGS. 18A and 18B.

Like the HUD 500 shown in FIG. 18A, the HUD 900 shown in FIG. 18B comprises the laser source 510, the projection optical system 520, the volume hologram 530, and the controller 950. However, unlike the HUD 500, the HUD 900 does not comprises the ½ wavelength plate 540. The controller 950 controls the laser source 510 and the MEMS mirror 523 of the projection optical system 520, but does not control the ½ wavelength plate 540. Operation of the HUD 900 is the same as that of the HUD 500 except the operation of the ½ wavelength plate 540 described with reference to FIG. 18A.

Figure 19A:
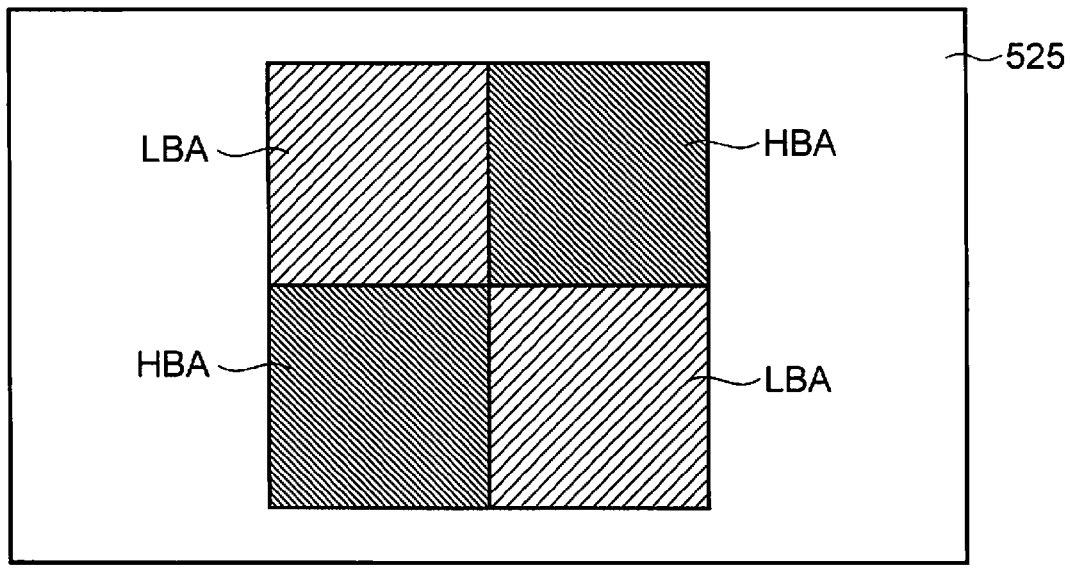
FIG. 19A is a schematic view of an image formed on a screen by the head-up display shown in FIG. 18B.
Figure 19B:
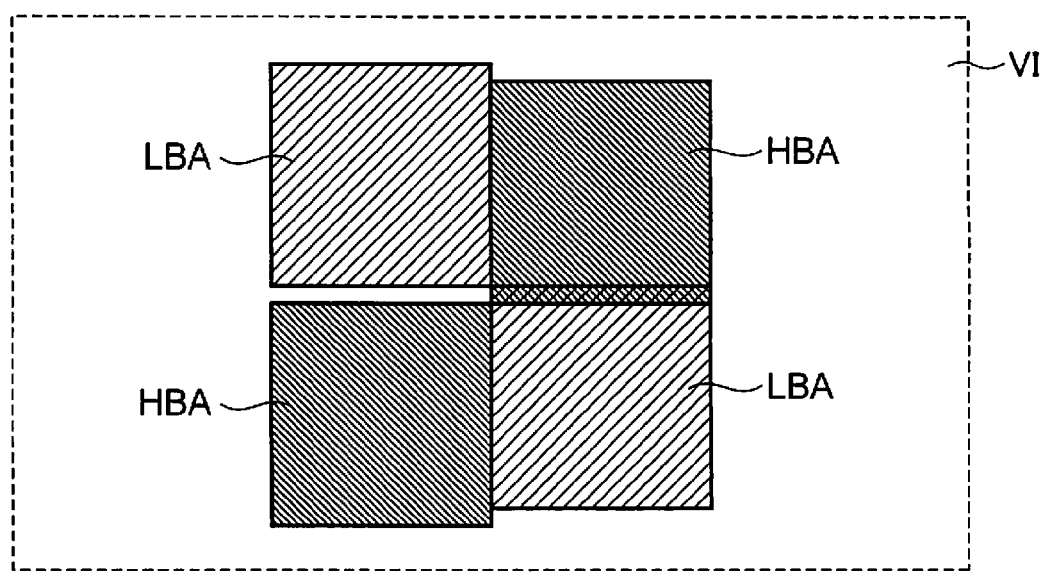
FIG. 19B is a schematic view of a virtual image watched by a driver.

FIG. 19A is a schematic view of an image formed by the HUD 900 on the screen 525. FIG. 19B is a schematic view of the virtual image VI viewed by the driver DR. The effects provided by the ½ wavelength plate 540 is described with reference to FIGS. 2B, 18A to 19B.

The laser source 510 may be, for example, a semiconductor laser source. It is known that a wavelength of a laser beam emitted by a semiconductor laser source depends on the laser beam power.

A red semiconductor laser source, which comprises an active layer of a composition consisting of aluminum (Al), gallium (Ga), indium (In), and phosphorus (p) to emit a red laser beam is exemplified as the semiconductor laser source. The red semiconductor laser source typically has a power dependency of about 0.005 nm/mW.

The image shown in FIG. 19A includes low luminance regions LBA formed by a laser beam having a low luminance and high luminance regions HBA formed by a laser beam having a high luminance. The low luminance regions LBA and high luminance regions HBA are alternately arranged. The wavelength of the laser beam forming the high luminance regions HBA is longer than the wavelength of the laser beam forming the low luminance regions LBA according to the aforementioned characteristics of the semiconductor laser source. Consequently, the positions of the high luminance regions HBA are shifted relative to the low luminance regions LBA on the virtual image VI.

For example, if the positions of the high luminance regions HBA are shifted downward relative to the low luminance regions LBA, as shown in FIG. 19B, a gap or overlap is formed between the high and low luminance regions HBA, LBA in the virtual image VI.

The direction (the vertical direction) in which the low luminance regions LBA and the high luminance regions HBA are relatively moved in the virtual image VI is determined by a relationship between an incidence angle and an emission angle of the laser beam LB under the Bragg condition shown in FIG. 2B. For example, if the angle θ1 at which the laser beam is incident on the volume hologram is smaller than the angle θ2 at which the laser beam is emitted from volume hologram as shown in FIG. 2B, the laser beam LB is emitted at a greater angle than the angle θ2 as the wavelength becomes longer (as the luminance becomes higher). On the contrary, if the angle θ1 is greater than the angle θ2, the laser beam LB is emitted at a smaller angle than the angle θ2 as the wavelength becomes longer (as the luminance becomes higher).

The HUD 500 shown in FIG. 18A has the aforementioned ½ wavelength plate 540 situated between the laser source 510 and the MEMS mirror 523. The ½ wavelength plate 540 is operated under the control of the controller 550.

The laser source 510 outputs the single-polarization laser beam LB at a consistent power to a predetermined direction for image formation. The controller 550 rotates the ½ wavelength plate 540 in response to data of the displayed image and the scanning position of the MEMS mirror 523, so that the polarization direction of the laser beam LB passing through the ½ wavelength plate 540 is modulated. If the image is formed at the highest luminance, the ½ wavelength plate 540 just in front of the MEMS mirror 523 sets the polarization direction of the laser beam LB to a perpendicular direction relative to the plane of FIG. 18A to make the laser beam LB incident on the volume hologram 530 as the S-polarized light.

In general, the volume hologram achieves high diffraction efficiency if the volume hologram receives the S-polarized light incident thereon, whereas it shows low diffraction efficiency to P-polarized light. Therefore, only the portion receiving the S-polarized light lights up brightly.

If the controller 550 sets the angle of the ½ wavelength plate 540 so that the ½ wavelength plate 540 sets the polarization direction of the laser beam LB to a vertical direction in the plane of FIG. 18A, the laser beam LB is incident on the volume hologram 530 as the P-polarized light. As a result, the portion receiving the P-polarized light becomes dark. If the controller 550 appropriately adjusts the angle of the ½ wavelength plate 540, the ratio between P-polarized light and S-polarized light of the laser beam LB incident on the volume hologram 530 is adjusted to display an image represented with a given gradation.

Since the power of the laser source 510 is kept constant, the wavelength of the laser beam LB incident on the volume hologram 530 is also kept substantially consistent. Therefore, it becomes less likely that the image shift results from the difference in luminance as described with reference to FIG. 19B.

According to the principles of this embodiment, a laser beam is scanned point by point by means of a scanning optical system such as the MEMS mirror to display an image with little image shift caused by difference in luminance. Therefore, the HUD 500 may display quality images.

In the present embodiment, the ½ wavelength plate 540 is exemplified as the modulator configured to adjust the polarization direction. Alternatively, another optical element configured to adjust the polarization direction of the laser beam at a given timing may be used as the modulator.

In this embodiment, a semiconductor laser is exemplified as the light source configured to emit a laser beam with changing wavelength according to an output power. As long as a light source having similar characteristics is used, quality images may be displayed according to the principles of this embodiment.

Figure 20:
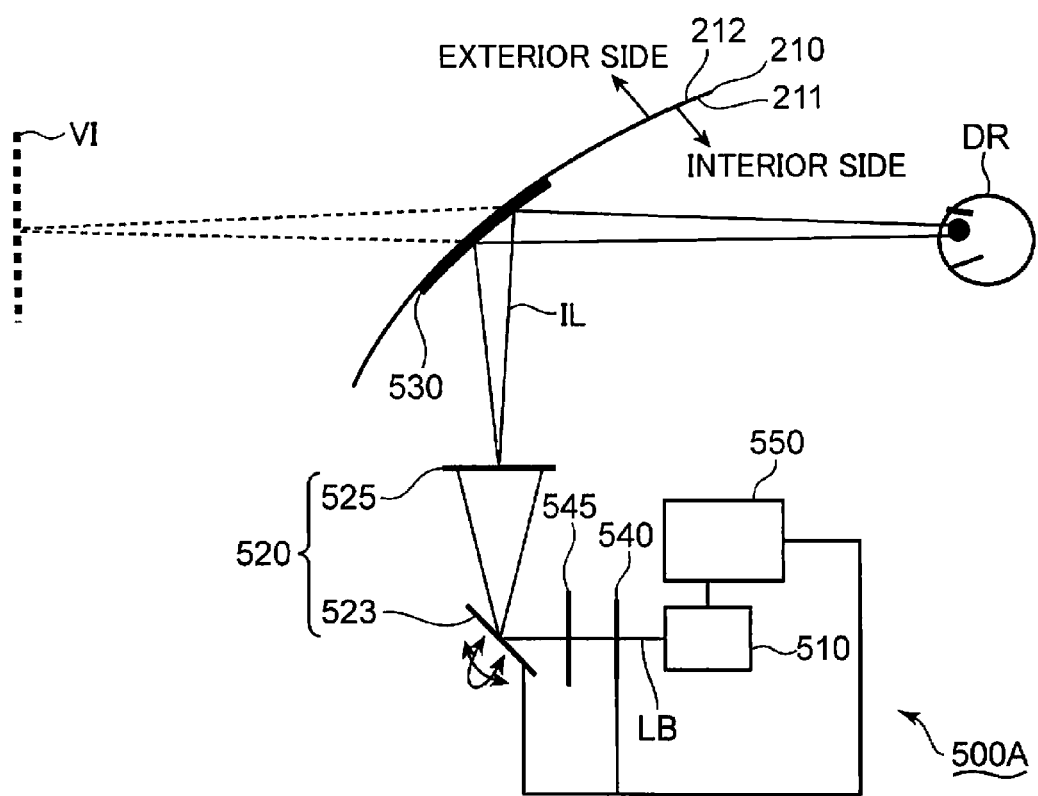
FIG. 20 is a schematic view of another head-up display exemplified as the see-through display according to the fourth embodiment.

FIG. 20 is a schematic view of another HUD exemplified as a see-through display according to the fourth embodiment. The other HUD according to the fourth embodiment is described with reference to FIGS. 18A and 20.

The HUD 500A shown in FIG. 20 comprises the laser source 510, the projection optical system 520, the volume hologram 530, the ½ wavelength plate 540, and the controller 550 like the HUD 500 shown in FIG. 18A. The HUD 500A additionally comprises a polarizing plate 545 situated between the ½ wavelength plate 540 and the MEMS mirror 523. The polarizing plate 545 absorbs or reflects a vertical polarization component as viewed in FIG. 20. The polarizing plate 545 allows transmission of the component polarized perpendicularly to the plane of FIG. 20. As a result, the laser beam LB is incident on the volume hologram 530 as the S-polarized light, so that the driver DR may view an image with a high luminance and with little image shift caused by difference in luminance. Thus, the HUD 500A may display quality images.

Fifth Embodiment

A frame image displayed by a see-through display according to the fifth embodiment is formed by means of time-divided sub-frames. The see-through display reduces the positional shift in an image by adjusting luminance for each of the sub-frames.

Figure 21A:
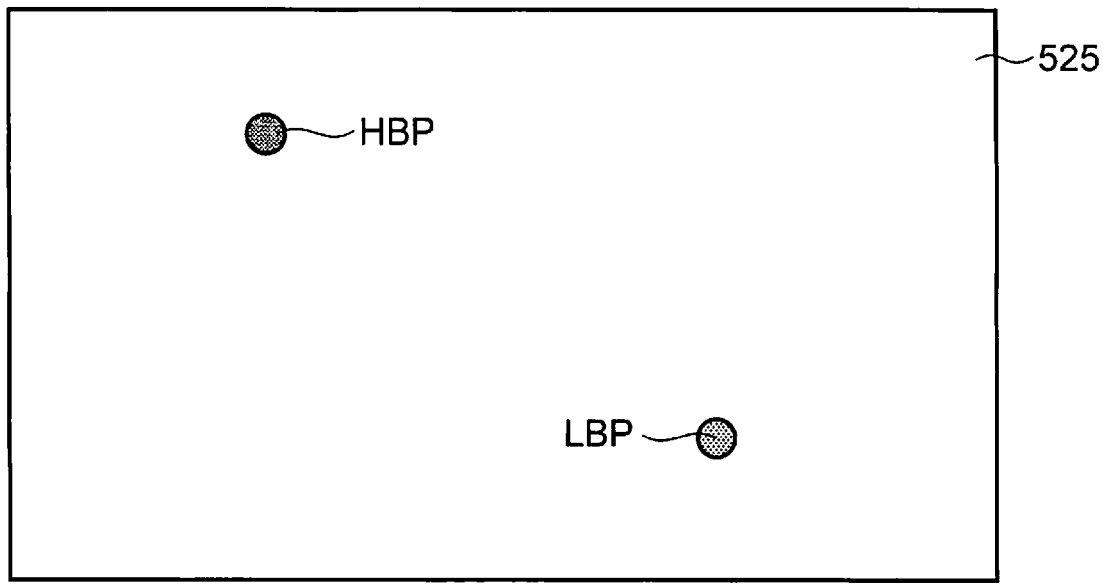
FIG. 21A is a schematic view of a frame image formed on a screen by the head-up display shown in FIG. 18B.
Figure 21B:
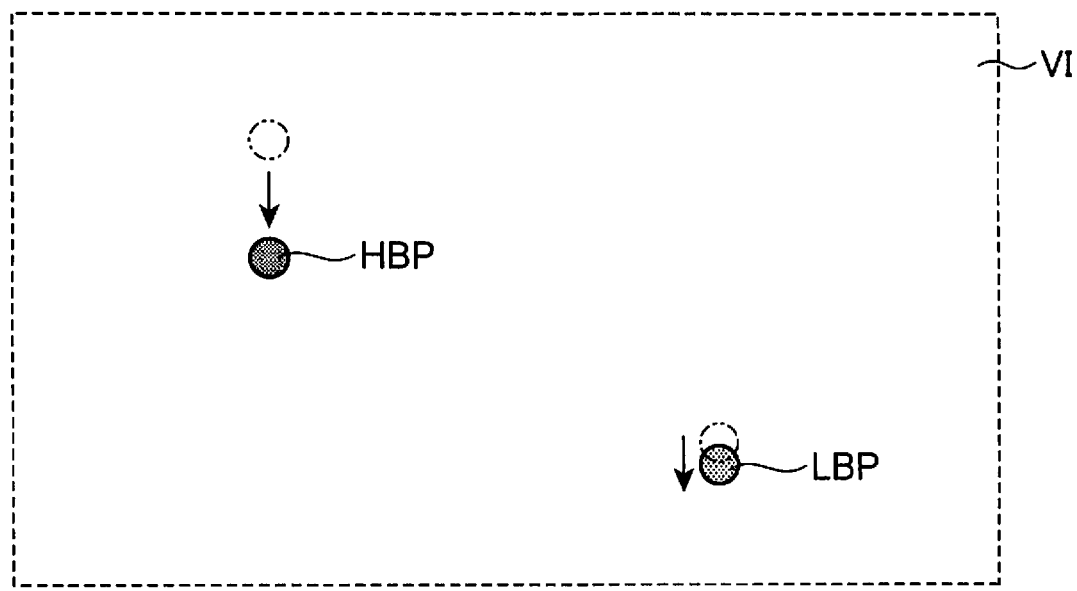
FIG. 21B is a schematic view of a virtual image corresponding to the frame image shown in FIG. 21A.

FIG. 21A is a schematic view of a frame image formed on the screen 525 by the HUD 900 shown in FIG. 18B. FIG. 21B is a schematic view of a virtual image VI corresponding to the frame image shown in FIG. 21A. Problems involved in the HUD 900 are described with reference to FIGS. 18B, 21A and 21B.

FIG. 21A shows a high luminance point HBP and a low luminance point LBP which are displayed on the screen 525. The high luminance point HBP has a gradation level of 230 with 8 bits. The low luminance point LBP has a gradation level of 80 with 8 bits.

The HUD 900 drives the laser source 510 to a desired luminance at each scanning position in order to form a single-frame image. If a semiconductor laser source is used as the laser source 510, the wavelength of the semiconductor laser source varies in accordance with the power, so that the positional shift amount of the high luminance point HBP is greater than the positional shift amount of the low luminance point LBP in the virtual image VI as shown in FIG. 21B. Accordingly, the relative position is shifted between the high and low luminance points HBP, LBP.

Figure 22:
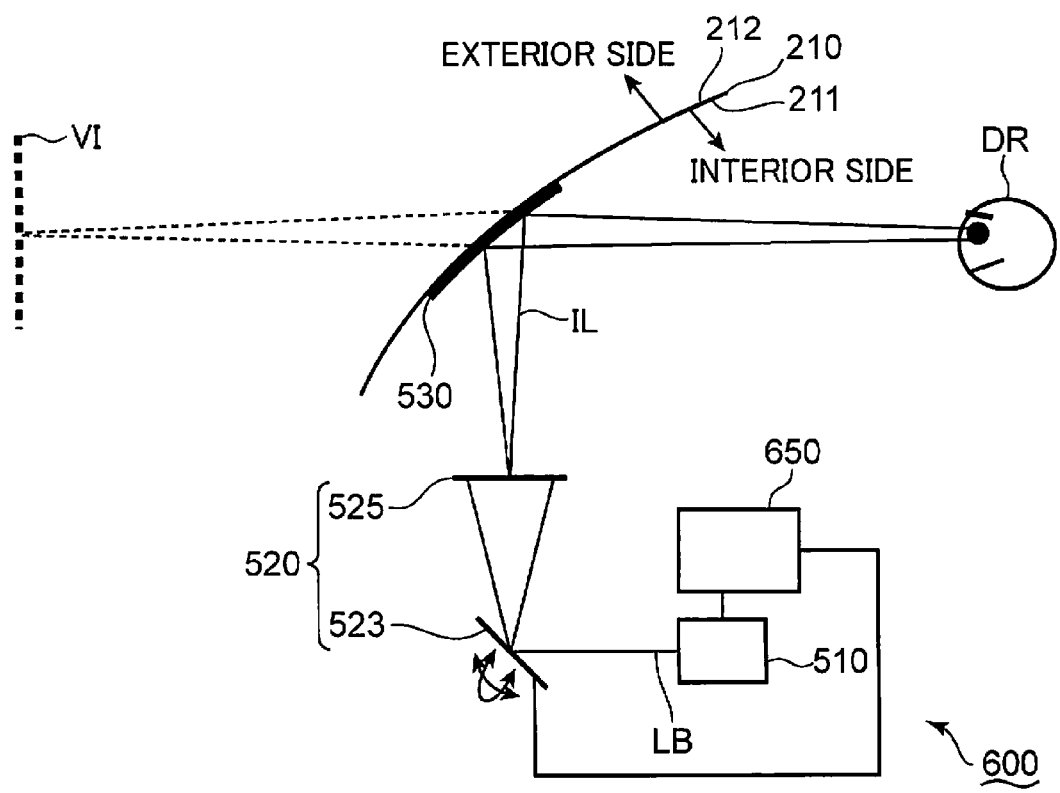
FIG. 22 is a schematic view of another head-up display exemplified as a see-through display according to the fifth embodiment.

FIG. 22 is a schematic view of an HUD exemplified as a see-through display according to the fifth embodiment. The HUD according to the fifth embodiment is described with reference to FIGS. 18B and 22.

The HUD 600 according to the fifth embodiment comprises the laser source 510, the projection optical system 520 and the volume hologram 530, like the HUD 900 described with reference to FIG. 18B. The HUD 600 additionally comprises a controller 650 electrically connected to the laser source 510 and the MEMS mirror 523. The laser source 510 and the MEMS mirror 523 are operated under the control of the controller 650, so that a single-frame image is formed with several time-divided sub-frames.

Figure 23A:
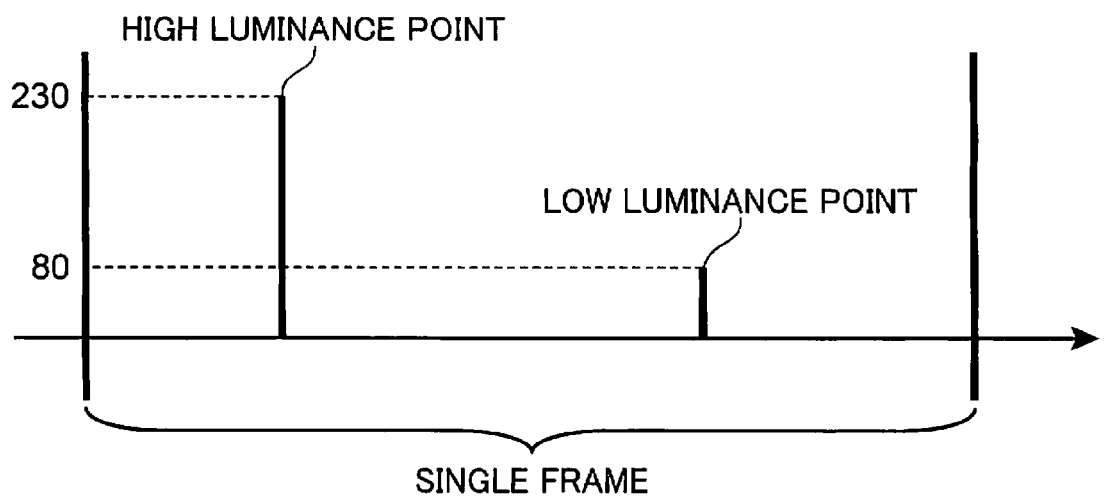
FIG. 23A is a timing chart schematically showing a lighting pattern of a laser source of the head-up display shown in FIG. 18B.
Figure 23B:
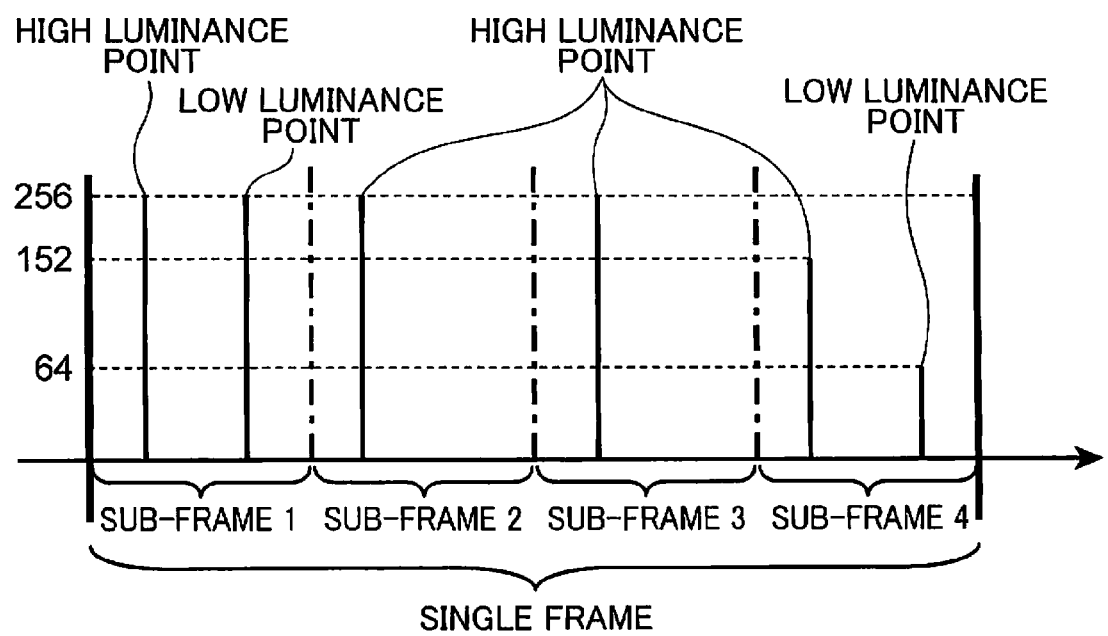
FIG. 23B is a timing chart schematically showing a lighting pattern of a laser source of the head-up display shown in FIG. 22.

FIG. 23A is a timing chart schematically showing a lighting pattern of the laser source 510 of the HUD 900. FIG. 23B is a timing chart schematically showing a lighting pattern of the laser source 510 of the HUD 600. Differences in lighting pattern of the laser source 510 are described with reference to FIGS. 18B, 21A to 23B.

The controller 650 of the HUD 600 divides a single frame into several sub-frames as shown in FIG. 18B to control the laser source 510. This reduces the relative difference in positional shift amount between the high and low luminance points HBP, LBP.

In the lighting pattern shown in FIG. 23B, a single frame is divided into four sub-frames (sub-frame 1, sub-frame 2, sub-frame 3 and sub-frame 4). The MEMS mirror 523 scans all over the screen 525 once in each of the sub-frames.

As described above, the high luminance point HBP has a gradation level of 230 with 8 bits. The conversion represented by the following equation (6) is applicable to all the gradations of the high luminance point HBP obtained by the four scanning operations.

[Equation 6]

$$230 \times 4 = 256 \times 3 + 152 \tag{6}$$

Based on the conversion represented by the aforementioned equation (6), the controller 650 causes the laser source 510 to light at a gradation level of 256 in the sub-frames 1 to 4, and at a gradation level of 152 in the sub-frame 4.

The lighting period at the high luminance point HBP for each sub-frame is ¼ of the lighting period of the high luminance point HBP shown in FIG. 23A. Therefore, the luminance of the high luminance point HBP for each frame is equal between FIGS. 23A and 23B.

As described above, the low luminance point LBP has a gradation level of 80 with 8 bits. The conversion represented by the following equation (7) is applicable to all the gradations of the low luminance point LBP obtained by the four scanning operations.

[Equation 7]

$$80 \times 4 = 256 + 64 \tag{7}$$

For the same reasons as described with reference to the high luminance point HBP, the luminance of the low luminance point LBP in each frame is equal between FIGS. 23A and 23B.

If a single frame is divided into several sub-frames, the laser source 510 may emit light only with a gradation level of 256 if the laser source 510 is activated during a period from the sub-frame 1 to the sub-frame 3. Accordingly, in the period from the sub-frame 1 to the sub-frame 3, the relative position of the points (the high and/or luminance points HBP, LBP) in the virtual image VI is unchanged regardless of whatever the level of gradation is. Thus, if a single frame is divided into several sub-frames, the period of time while the laser source 510 emits light at an intermediate gradation level becomes shorter, which preferably results in little shift of the relative position in the virtual image VI caused by difference in gradation. Therefore, the HUD 600 may display quality images.

In this embodiment, the light amount emitted by the laser source 510 during the period from the sub-frame 1 to the sub-frame 3 is set to a maximum value in order to display the high luminance point HBP. In order to display the low luminance point LBP, the light amount emitted by the laser source 510 during the period of the sub-frame 1 is set to the maximum value whereas the light amount emitted by the laser source 510 during the period of the sub-frames 2 and 3 is set to zero. However, the sub-frames for which the light amount emitted by the laser source 510 is set to the maximum value or zero may be determined as appropriate. As long as the light amount emitted by the laser source 510 during a period of at least one of several sub-frames is set to the maximum value or zero, it becomes less likely that the shift in the displayed image is perceived.

In this embodiment, a single frame is divided into four sub-frames. Alternatively, a single frame is divided into a number, which is less or more than four, of sub-frames. The effect of reducing the relative positional shift becomes more significant as the number of sub-frames into which a single frame is divided is increased.

In this embodiment, the HUD 600 has a single light source. However, the HUD may have several laser sources emitting different laser beams in wavelength.

In this embodiment, a semiconductor laser source is exemplified as the laser source 510. Alternatively, the HUD may have another light source having similar wavelength/output power characteristics. The same effect to reduce the aforementioned relative positional shift may be obtained in this case as well.

In the preferred embodiments described so far, a laser source is exemplified as the light source or light source element. Alternatively, another light source (e.g. an LED) may be used as the light source or light source element. The principles of the embodiments are suitably applicable to any light source as long as it has the same wavelength characteristics as those of the above-mentioned laser sources.

The preferred embodiments described so far are merely shown as an examplarty see-through display. Therefore, the descriptions so far do not limit in any way an applicable range of the principles of the preferred embodiments. It should be understood that those skilled in the art may make various modifications and combinations without departing from the spirit and scope of the aforementioned principles.

The aforementioned embodiments principally have the following configurations. The see-through display with the following configuration is less likely to cause reduction in luminance or deterioration in luminance distribution and color distribution, which result from individual variations of the light source wavelength, color shifts caused by changes in wavelength, decreased diffraction efficiency. The see-through display with the following configurations may display quality images with causing little deterioration in image quality.

The see-through display according to one aspect of the aforementioned embodiments includes: a light source configured to emit light; a projection optical system configured to project the light which is emitted by the light source; and a volume hologram configured to deflect the light which is projected by the projection optical system, wherein: the volume hologram has a linear expansion coefficient of $\alpha$ (/° C.) and interference fringes recorded with recording light having a wavelength of $\Lambda$ (nm); a wavelength of the light emitted by the light source has a temperature dependency of K (nm/° C.); and the wavelength $\Lambda$ (nm) and the temperature dependency K (nm/° C.) satisfy a relationship of $0 \le K/\Lambda \le 2\alpha$.

According to the aforementioned configuration, the projection optical system projects the light emitted by the light source. The volume hologram configured to diffract the light which is projected by the projection optical system has a linear expansion coefficient of $\alpha$ (/° C.) and interference fringes which are recorded with recording light having a wavelength of $\Lambda$ (nm). The wavelength of the light emitted by the light source has a temperature dependency of K (nm/° C.). Since the wavelength $\Lambda$ (nm) and the temperature dependency K (nm/° C.) satisfy the relationship of $0 \le K/\Lambda \le 2\alpha$, there may be little shift from the Bragg condition caused by temperature fluctuations. Thus, there may be little deterioration in image quality such as shifted image display position caused by variation in diffraction angle or reduced luminance resulting from decreased diffraction efficiency.

In the aforementioned configuration, it is preferable that the light source includes n (n is an integer greater than 1) light source elements; the light source elements emit light with wavelengths of $\lambda 1, \lambda 2, \ldots, \lambda n$, respectively, at a predetermined temperature; the interference fringes are formed by means of recording light having wavelengths of $\Lambda 1, \Lambda 2, \ldots, \Lambda n$ in order to diffract the light with the wavelengths of $\lambda 1, \lambda 2, \ldots, \lambda n$, respectively; and a difference value between a maximum value and a minimum value among $(\lambda 1 - \Lambda 1)/\Lambda 1$, $(\lambda 2 - \Lambda 2)/\Lambda 2, \ldots$, and $(\lambda n - \Lambda n)/\Lambda n$ is 0.005 or less.

According to the aforementioned configuration, the light source includes n (n is an integer greater than 1) light source elements. The light source elements emit the light having wavelengths of $\lambda 1, \lambda 2, \ldots, \lambda n$ at a predetermined temperature, respectively. The interference fringes are formed by means of the recording light having wavelengths of $\Lambda 1, \Lambda 2, \ldots, \Lambda n$ in order to diffract the light having wavelengths of $\lambda 1, \lambda 2, \ldots, \lambda n$, respectively. The difference value between the maximum value and the minimum value among $(\lambda 1 - \Lambda 1)/\Lambda 1, (\lambda 2 - \Lambda 2)/\Lambda 2, (\lambda n - \Lambda n)/\Lambda n$ is 0.005 or less. Therefore, it becomes less likely that viewers perceive relative shift between images formed by means of the light having wavelengths of $\lambda 1, \lambda 2, \ldots, \lambda n$.

The see-through display according to another aspect of the aforementioned embodiments includes a light source configured to emit light; a projection optical system configured to project the light which is emitted by the light source; a volume hologram configured to deflect the light which is projected by the projection optical system; and an adjuster configured to adjust a temperature of the light source, wherein: a wavelength of the light emitted by the light source has a temperature dependency; the volume hologram has a linear expansion coefficient of $\alpha$, and interference fringes recorded with recording light having a center wavelength of $\Lambda$; and the adjuster adjusts the temperature of the light source based on the linear expansion coefficient $\alpha$ and the center wavelength $\Lambda$ of the recording light.

According to the aforementioned configuration, the projection optical system projects the light emitted by the light source. The volume hologram configured to deflect the light which is projected by the projection optical system has the linear expansion coefficient of $\alpha$, and interference fringes which are recorded with the recording light having the center wavelength of $\Lambda$. The adjuster adjusts the temperature of the light source on the basis of the linear expansion coefficient $\zeta$ and the center wavelength $\Lambda$ of the recording light. Therefore, there is little deterioration in image quality such as positional shift of the image display caused by variation in diffraction angle or reduction in luminance resulting from decreased diffraction efficiency.

In the aforementioned configuration, it is preferable that the light source includes light source elements; the light source elements emit light having different wavelengths from each other, respectively; and the adjuster individually sets a target temperature for each of the light source elements, and adjusts the temperature of each of the light source elements to achieve the set target temperature.

According to the aforementioned configuration, the light source includes the light source elements. The light source elements emit the light with different wavelengths from each other. The adjuster individually sets the target temperature for each of the light source elements, and adjusts the temperature of the light source elements to achieve the target temperature, respectively. Therefore, it becomes less likely that viewers perceive relative shift between images formed by means of light having different wavelengths.

In the aforementioned configuration, it is preferable that the adjuster adjusts the temperature of the light source based on not only the linear expansion coefficient α and the center wavelength Λ, but also a wavelength of the light emitted by the light source at a predetermined temperature.

According to the aforementioned configuration, the adjuster adjusts a temperature of the light source not only on the basis of the linear expansion coefficient α and the center wavelength Λ but also on the basis of the wavelength emitted by the light source at a predetermined temperature. Therefore, there may be little deterioration in image quality such as positional shift of the image display because of variation in diffraction angle or reduction in luminance resulting from decreased diffraction efficiency.

In the aforementioned configuration, it is preferable that the see-through display further includes a temperature sensor configured to measure at least one of temperature of the volume hologram and temperature around the volume hologram, wherein the adjuster sets the target temperature based on the temperature which is measured by the temperature sensor.

According to the aforementioned configuration, the temperature sensor measures at least one of the temperature of the volume hologram and the temperature around the volume hologram. The adjuster sets the target temperature on the basis of the temperature which is measured by the temperature sensor. Therefore, there may be little deterioration in image quality such as positional shift of the image display caused by variation in diffraction angle or reduction in luminance resulting from decreased diffraction efficiency.

The see-through display according to yet another aspect of the aforementioned embodiments includes a light source including n (n is an integer greater than 1) light source elements configured to emit light; a projection optical system configured to project the light which is emitted by the light source; and a volume hologram configured to deflect the light which is projected by the projection optical system, wherein: the volume hologram has interference fringes formed by means of recording light having wavelengths of Λ1, Λ2, . . . , Λn in order to diffract the light emitted by the n light source elements, respectively; wavelengths of the light, which is emitted by the n light source elements and diffracted by the interference fringes formed with the recording light having wavelengths of Λ1, Λ2, . . . , Λn, have temperature dependencies of K1 (nm/° C.), K2 (nm/° C.), Kn (nm/° C.), respectively; and a difference value between a maximum value and a minimum value among K1/Λ1, K2/Λ2, . . . , and Kn/Λn is 0.0001 or less.

According to the aforementioned configuration, the projection optical system projects light emitted by the light source which includes n light source elements configured to emit light. The volume hologram deflects the light which is projected by the projection optical system. The volume hologram has interference fringes which are formed by means of the recording light having wavelengths of Λ1, Λ2, . . . , Λn for diffracting the light which is emitted by the n light source elements, respectively. The wavelengths of light emitted by the n light source elements have temperature dependencies of K1 (nm/° C.), K2 (nm/° C.), Kn (nm/° C.), respectively. The difference value between the maximum value and the minimum value among K1/Λ1, K2/Λ2, Kn/Λn is 0.0001 or less. Therefore, it becomes less likely that viewers perceive relative shift between the images, which are formed by means of the light emitted by the n light source elements, respectively.

The see-through display according to yet another aspect of the aforementioned embodiments includes: a light source configured to emit light; a projection optical system configured to project the light which is emitted by the light source; and a volume hologram configured to deflect the light which is projected by the projection optical system, wherein: the light source includes a first light source element which emits first light having a first wavelength, and a second light source element which emits second light having a different wavelength from the first wavelength; and a first image formed with the first light is displayed at a distant position from that of a second image formed with the second light.

According to the aforementioned configuration, the projection optical system projects light emitted by the light source. The volume hologram deflects the light which is projected by the projection optical system. The light source includes the first light source element which emits the first light with the first wavelength, and the second light source element which emits the second light with a different wavelength from the first wavelength. The first image formed with the first light is displayed at a position distant from the second image formed with the second light, which results in less noticeable color shift.

The see-through display according to yet another aspect of the aforementioned embodiments includes: a light source configured to emit light; a projection optical system configured to project the light which is emitted by the light source; and a volume hologram configured to deflect the light which is projected by the projection optical system, wherein the projection optical system includes an MEMS mirror which reflects the light from the light source, and a modulator which modulates a polarization direction of the light emitted by the light source before the MEMS mirror reflects the light from the light source.

According to the aforementioned configuration, the projection optical system projects light emitted by the light source. The volume hologram deflects the light which is projected by the projection optical system. The projection optical system includes the MEMS mirror which reflects the light from the light source, and the modulator which modulates a polarization direction of the light from the light source before the MEMS mirror reflects the light from the light source. Therefore there becomes little image shift.

The see-through display according to yet another aspect of the aforementioned embodiments includes: a light source configured to emit light; a projection optical system configured to project the light, which is emitted by the light source, to form a frame image; and a volume hologram configured to deflect the light which is projected by the projection optical system, wherein: the projection optical system includes an MEMS mirror; the frame image is formed by means of time-divided sub-frames; and a light amount emitted by the light source is zero or a maximum value in at least one of the sub-frames.

According to the aforementioned configuration, the projection optical system including the MEMS mirror projects the light which is emitted by the light source to form a frame image. The volume hologram deflects the light which is projected by the projection optical system. The frame image is formed by means of time-divided sub-frames. Since the light amount emitted by the light source when at least one of the sub-frames is displayed is zero or a maximum value, it becomes less likely that relative shift of the displayed positions in the image is perceived.

In the aforementioned configuration, it is preferable that the light source includes a semiconductor laser source.

According to the aforementioned configuration, the light source includes a semiconductor laser source. Even if there are changes in the wavelength of the laser beam from the semiconductor laser source, it becomes less likely that the positional shift of the image display is perceived.

A head-up display mounted on a vehicle having a windshield in which an intermediate film intervenes to selectively adjust a wavelength component of light entering into a cabin of the vehicle according yet another aspect of the aforementioned embodiments includes the aforementioned see-through display, wherein the volume hologram is situated between the cabin and the intermediate film.

According to the aforementioned configuration, the head-up display, which is mounted on a vehicle having a windshield in which an intermediate film intervenes to selectively adjust a wavelength component of the light entering into the cabin of the vehicle, is provided with the aforementioned see-through display. The volume hologram is situated between the cabin and the intermediate film, which results in few changes in characteristics of the volume hologram caused by the light entering into the cabin.

INDUSTRIAL APPLICABILITY

The principles of the aforementioned embodiments less likely to cause color shift or deterioration in diffraction efficiency resulting from changes in ambient temperature. Therefore, it becomes less likely that there is deterioration in image quality such as uneven luminance or color in the image. Accordingly, the principles of the aforementioned embodiments are suitably applicable to various see-through displays such as HUDs and HMDs.

The invention claimed is:

1. A see-through display comprising:
a light source including n (n is an integer greater than 1) light source elements which emit emission light with wavelengths of $\lambda 1, \ldots, \lambda n$, respectively, at a predetermined temperature;
a projection optical system configured to project the emission light which is emitted by the light source;
a volume hologram configured to deflect the emission light which is projected by the projection optical system; and
a controller configured to control the light source,
wherein the volume hologram has a linear expansion coefficient of $\alpha$ (/° C.) and interference fringes formed with recording light having wavelengths of $\Lambda 1, \ldots, \Lambda n$ in order to diffract the emission light with the wavelengths of $\lambda 1, \ldots, \lambda n$, respectively, and
wherein the controller identifies a maximum value and a minimum value from $(\lambda 1 - \Lambda 1)/\Lambda 1, \ldots,$ and $(\lambda n - \Lambda n)/\Lambda n$ and calculates a difference between the maximum value and the minimum value to control the light source so that the difference is 0.005 or less.

2. The see-through display according to claim 1, further comprising:
an adjuster configured to adjust a temperature of the light source, wherein:
the wavelengths of the emission light emitted by the light source elements have a temperature dependency; and
the adjuster adjusts the temperature of the light source based on the linear expansion coefficient $\alpha$.

3. The see-through display according to claim 2, wherein:
the light source elements each emit the emission light having different wavelengths from each other; and
the adjuster individually sets a target temperature for each of the light source elements, and adjusts a temperature of each of the light source elements to achieve the set target temperature.

4. The see-through display according to claim 2, wherein the adjuster adjusts the temperature of the light source based on not only the linear expansion coefficient $\alpha$, but also the wavelength of the emission light emitted by the light source at a predetermined temperature.

5. The see-through display according to claim 2, further comprising
a temperature sensor configured to measure at least one of a temperature of the volume hologram and a temperature around the volume hologram, wherein
the adjuster sets a target temperature of the light source based on the temperature which is measured by the temperature sensor.

6. A see-through display comprising:
a first light source element which emits a first emission light having a first wavelength;
a second light source element which emits a second emission light having a second wavelength that is different from the first wavelength;
a projection optical system including a screen on which the first emission light is projected to form a first image and the second emission light is projected to form a second image; and
a volume hologram including a first hologram element, which deflects the first emission light projected by the projection optical system, and a second hologram element, which covers the first hologram element and deflects the second emission light projected by the projection optical system,
wherein the second light source element emits the second emission light in synchronization with emission of the first emission light from the first light source element,
wherein the volume hologram receives both the first and second emission lights through the screen, and
wherein the first image is displayed on the screen at a distant position from the second image.

7. A see-through display comprising:
a light source configured to emit emission light;
a projection optical system configured to project the emission light which is emitted by the light source;
a controller configured to control the projection optical system; and
a volume hologram configured to deflect the emission light which is projected by the projection optical system, wherein
the projection optical system includes an MEMS mirror which reflects the emission light from the light source, and a ½ wavelength plate which is rotated by the controller to modulate a polarization direction of the emission light emitted by the light source before the MEMS mirror reflects the emission light from the light source and make the emission light incident on the volume hologram as S-polarized light.

8. A see-through display comprising:
a light source configured to emit emission light;
a projection optical system configured to project the emission light, which is emitted by the light source, to form a frame image; and a volume hologram configured to deflect the emission light which is projected by the projection optical system, wherein:

the projection optical system includes an MEMS mirror;

the frame image is formed of time-divided sub-frames; and the light source stops emission of the emission light in at least one of the time-divided sub-frames.

9. The see-through display according to claim 1, wherein the light source includes a semiconductor laser source.

10. A head-up display mounted on a vehicle having a windshield in which an intermediate film intervenes to selectively adjust a wavelength component of light entering into a cabin of the vehicle, the head-up display comprising:

the see-through display according to claim 1, wherein the volume hologram is situated between the cabin and the intermediate film.

11. A see-through display comprising:

a light source configured to emit emission light;

a projection optical system configured to project the emission light, which is emitted by the light source, to form a frame image;

a controller configured to control the light source; and a volume hologram configured to deflect the emission light which is projected by the projection optical system, wherein:

the projection optical system includes an MEMS mirror;

the frame image is formed of time-divided sub-frames;

the light source stops emission of the emission light to achieve a zero value of an emission light amount or emits the emission light to achieve a maximum value of the emission light amount in at least one of the time-divided sub-frames under control of the controller; and the controller controls the light source to shorten a time length of the time-divided sub-frames during which the light source sets the emission light amount at an intermediate value between the zero value and the maximum value.

12. The see-through display according to claim 1, wherein the light source includes a wavelength conversion laser source.

* * * * *